Nov. 12, 1968   A. J. SARKA   3,410,183
MATERIAL PROCESSING METHOD AND APPARATUS
Filed Nov. 26, 1965   11 Sheets-Sheet 1
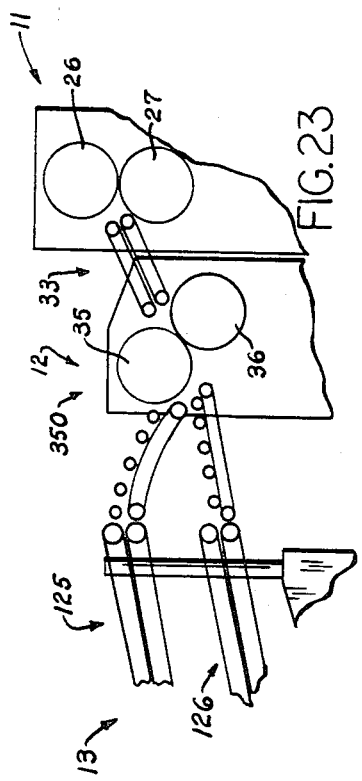
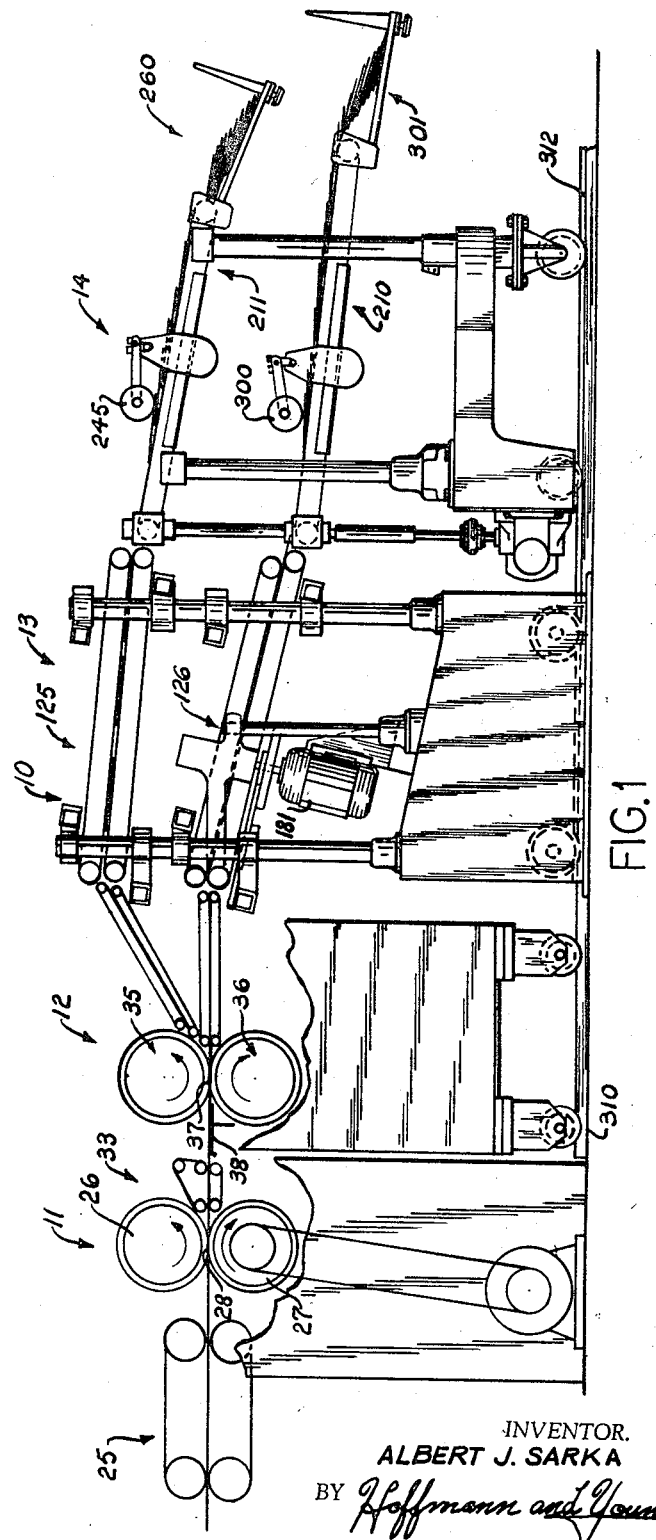
INVENTOR.
ALBERT J. SARKA
BY Hoffmann and Yount
ATTORNEYS

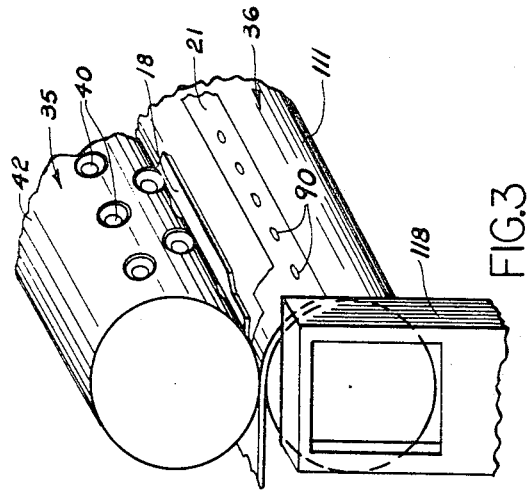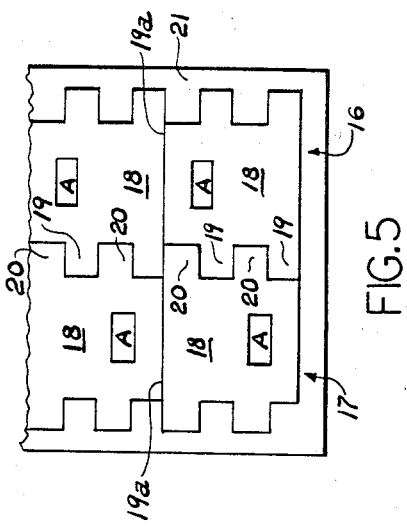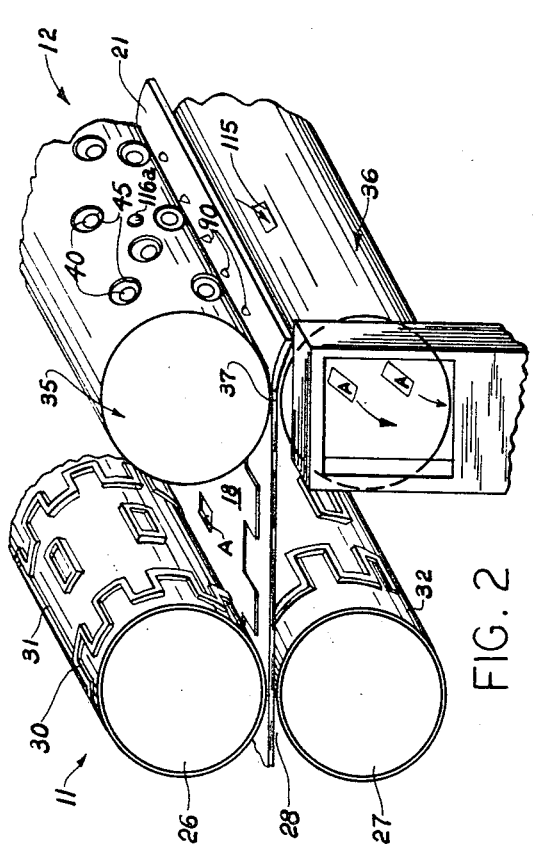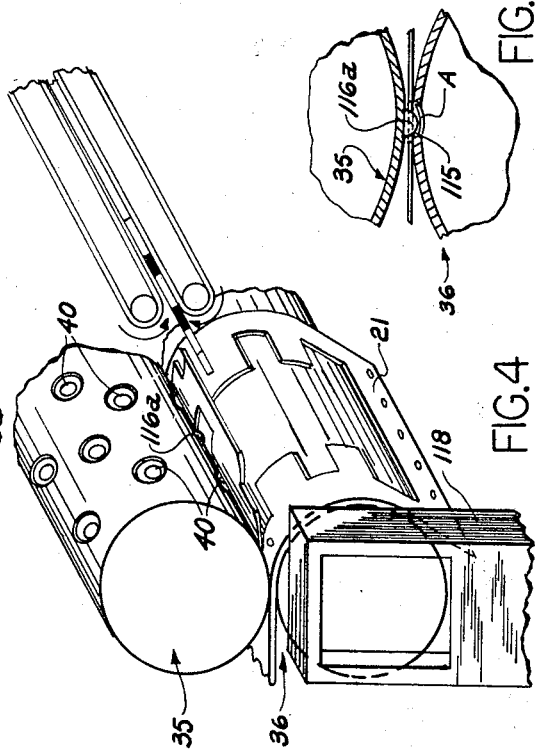

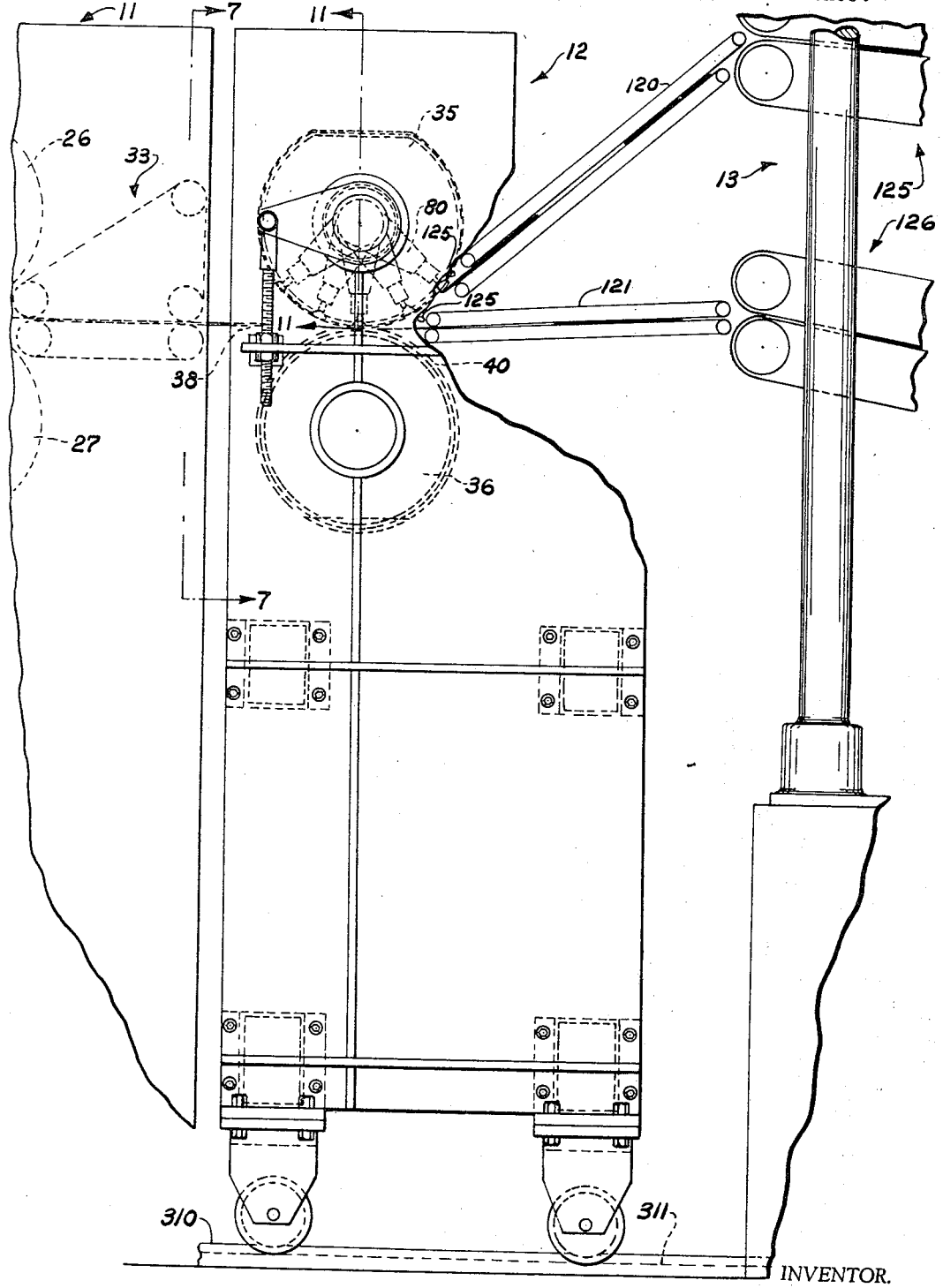

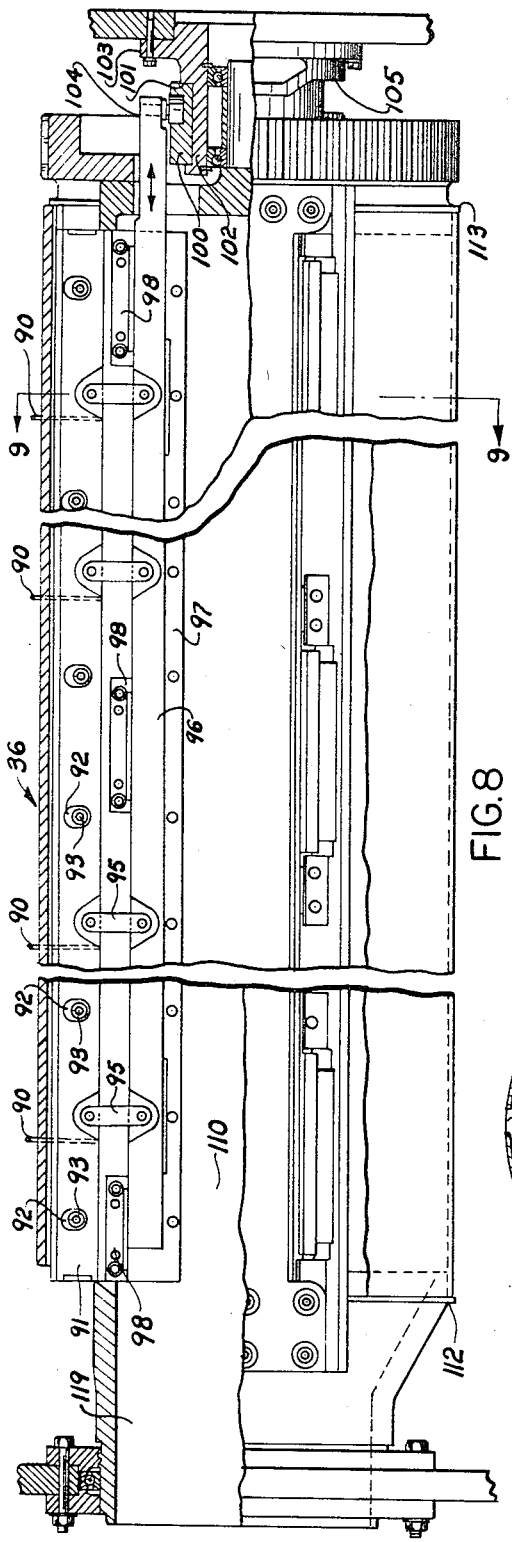
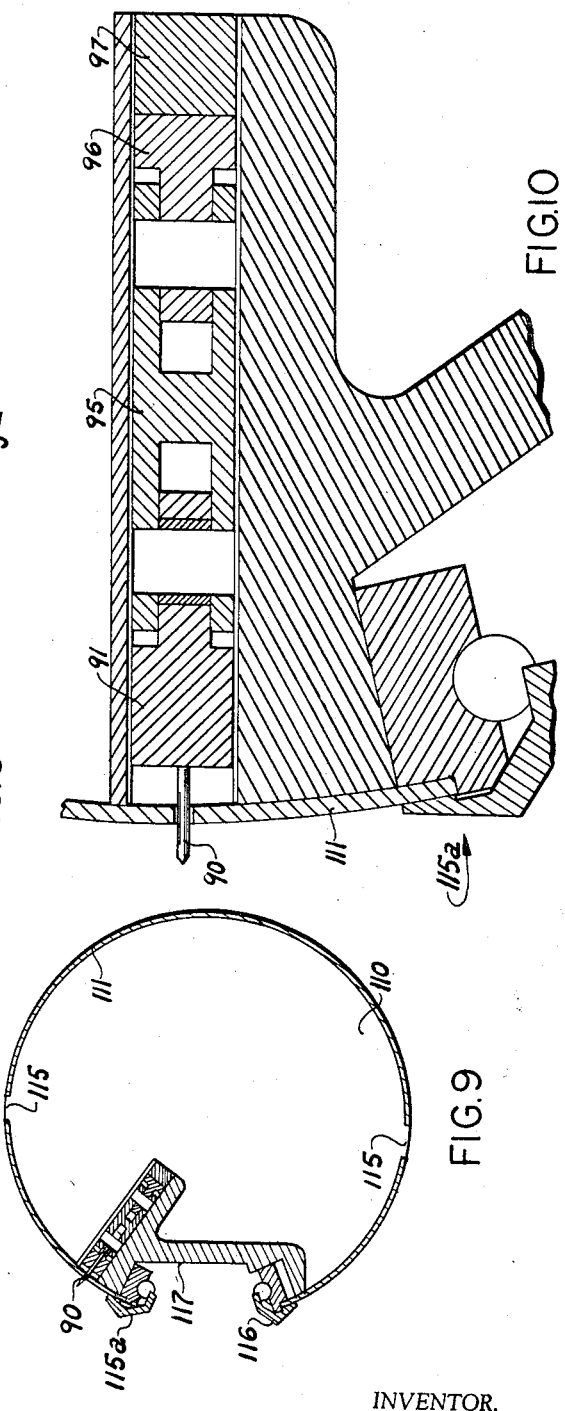

Nov. 12, 1968 A. J. SARKA 3,410,183
MATERIAL PROCESSING METHOD AND APPARATUS
Filed Nov. 26, 1965 11 Sheets-Sheet 6
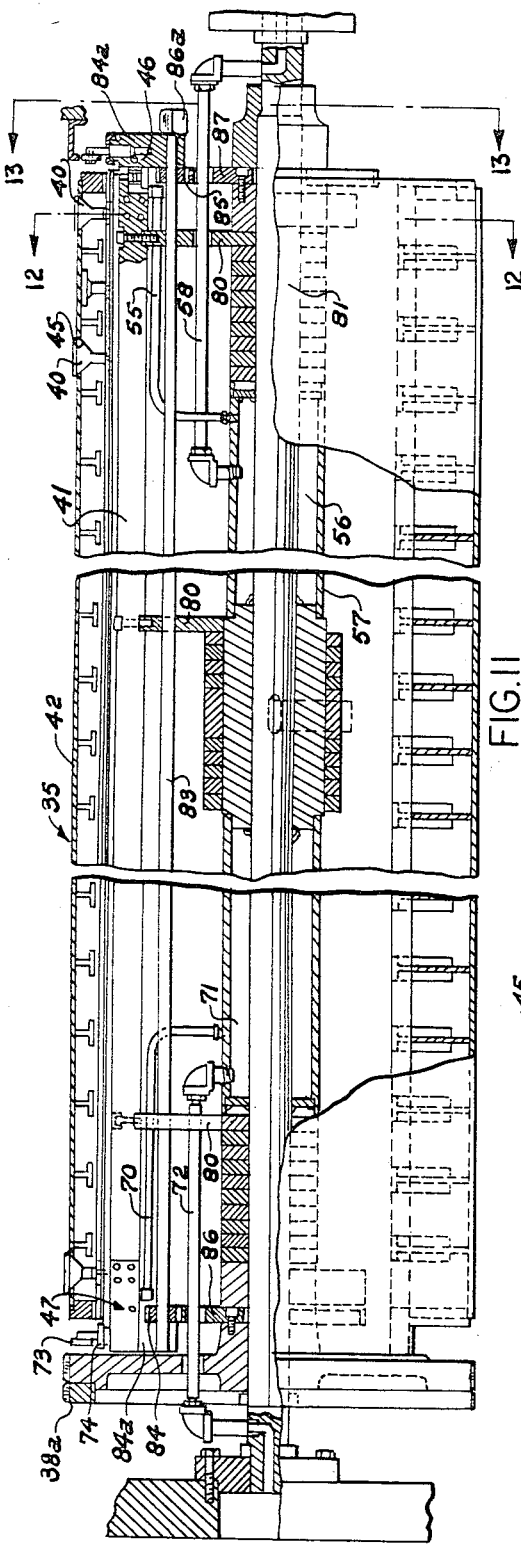
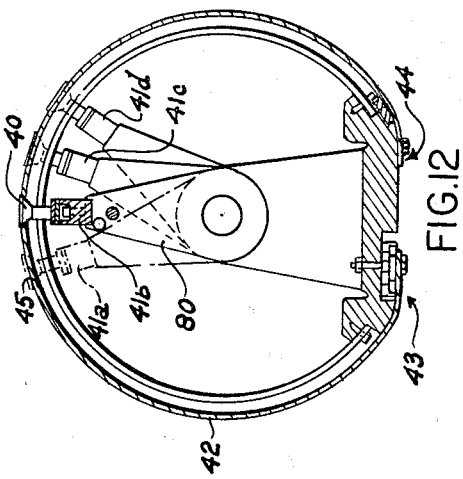
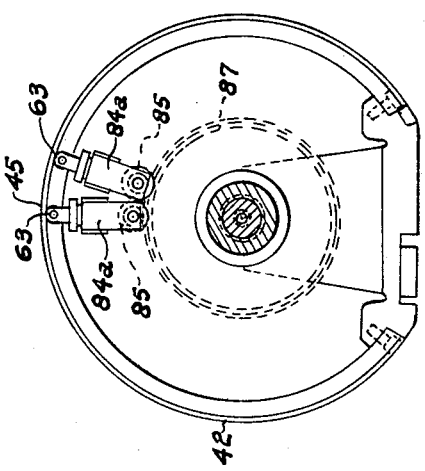
INVENTOR.
ALBERT J. SARKA
BY Hoffmann and Yount
ATTORNEYS

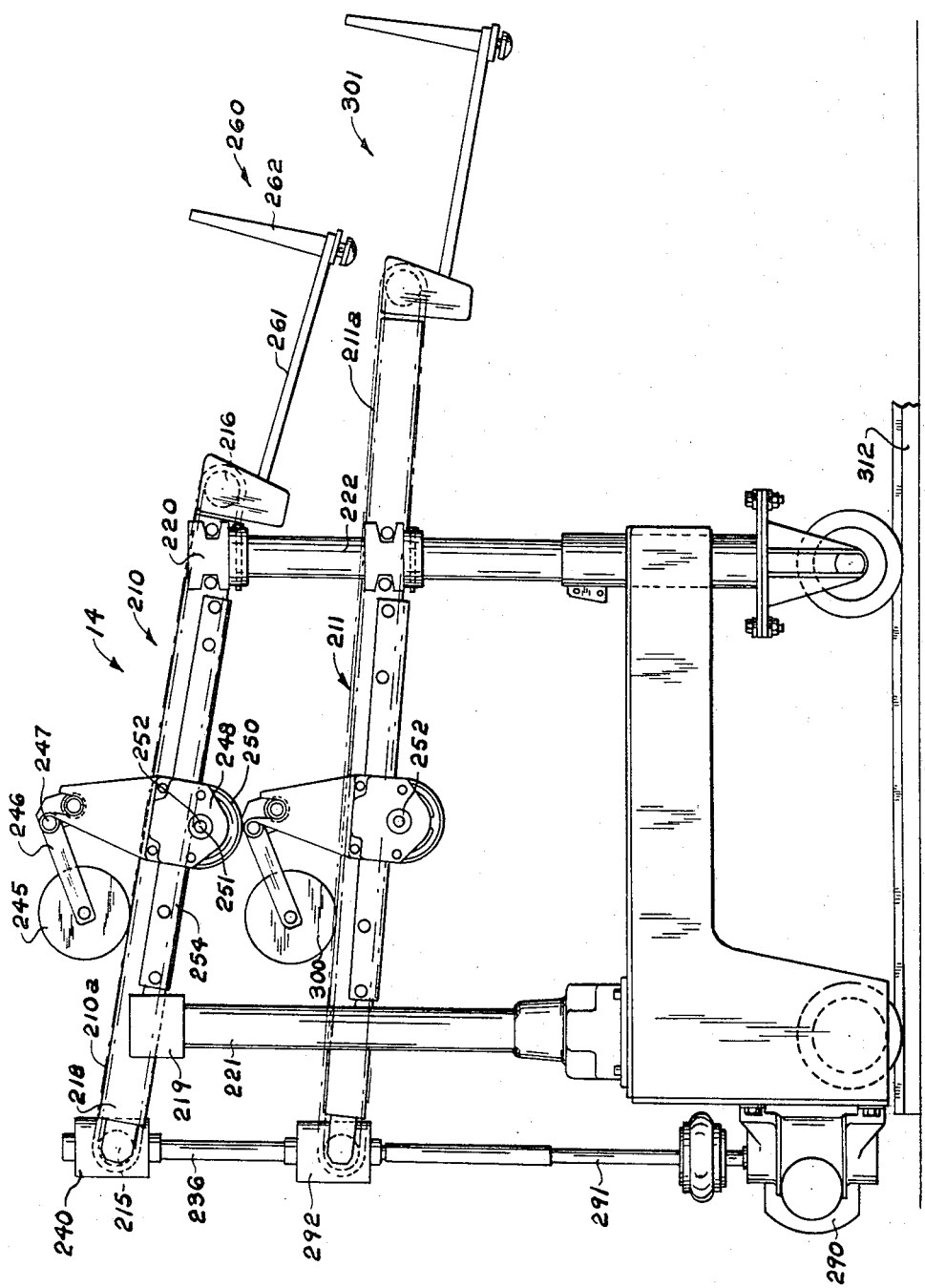

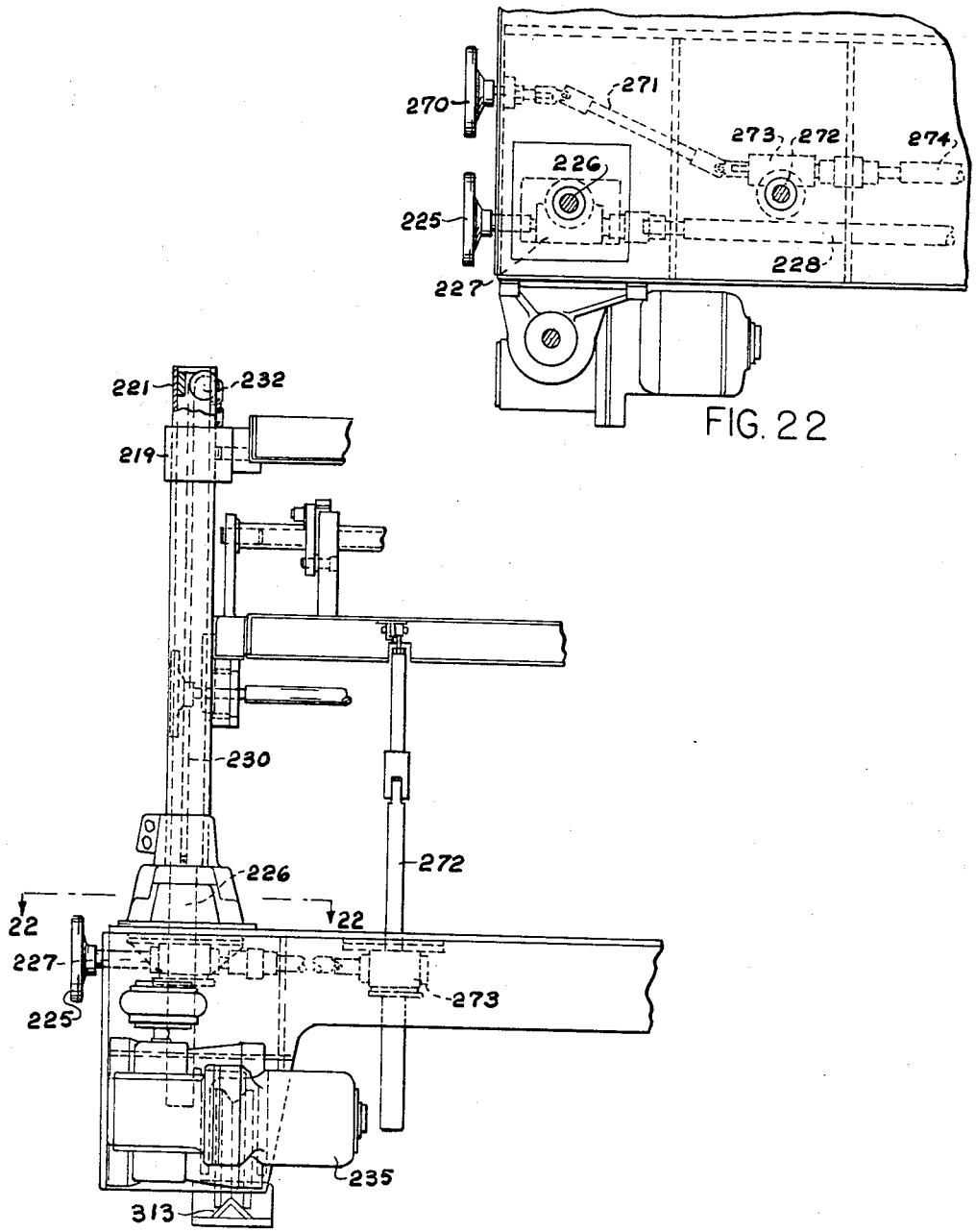

United States Patent Office 3,410,183
Patented Nov. 12, 1968

3,410,183
MATERIAL PROCESSING METHOD
AND APPARATUS
Albert J. Sarka, Fairview Park, Ohio, assignor to Harris-Intertype Corporation, Cleveland, Ohio, a corporation of Delaware
Filed Nov. 26, 1965, Ser. No. 509,754
26 Claims. (Cl. 93—36)

ABSTRACT OF THE DISCLOSURE

A material processing apparatus comprises a pair of cooperating cutting and creasing cylinders which cut and crease sheet material into a plurality of articles and waste. The articles are arranged on the sheet material in a plurality of rows extending transverse to the direction of movement of the sheet material with each row comprising a plurality of laterally adjacent articles. A stripper unit then strips the waste from the articles and the articles are then separated into a pair of paths. The articles are conveyed in the separate paths by a tape conveyor unit which laterally separates the adjacent articles as they are being conveyed. The tape conveyor unit delivers the articles to a shingling conveyor unit on which the articles are arranged in an overlapped relationship and which have trays which receive the overlapped articles.

The present invention relates to a material processing method and apparatus, and particularly to a sheet material processing method and apparatus for use in the formation of box blanks.

The principal object of the present invention is the provision of a new and improved, high-speed, reliable material processing method and apparatus in which sheet material is cut into waste and articles and the waste and articles are then separated in an effective and simple manner.

A further object of the present invention is the provision of a new and improved method and apparatus for processing sheet material in which the sheet material is cut into waste and articles in a cutting nip defined by a pair of rotary cylinders and then the waste and articles are separated by a pair of cooperating separator cylinders.

A still further object of the present invention is the provision of a new and improved sheet material processing apparatus having a pair of cylinders defining a cutting nip and in which the sheet material is cut into articles and waste as it is advanced therethrough and a pair of cylinders defining a stripping nip and which are cooperable to effect a separation of the articles and the waste, and wherein the stripping nip is spaced from the cutting nip a distance which is less than the dimension of the sheet material being handled as measured in the feeding direction so that the trailing portion of the sheet material is in the cutting nip, while a leading portion of the material is in the stripping nip.

Another object of the present invention is the provision of a new and improved material processing apparatus which is operable to separate articles and waste and wherein the waste is engaged by means carried on a cylinder and moved therewith and the articles are engaged by means carried on another cylinder and are moved therewith away from the waste, thus effecting movement of the articles and waste in different paths for separation thereof.

Still another object of the present invention is the provision of a new and improved sheet material processing apparatus wherein articles and waste are separated by a pair of cooperating rotary cylinders defining a stripping nip therebetween and one of which carries means for engaging the leading edge of the waste material for conveying the waste material away from the stripping nip and around a portion of the circumference of the cylinder, and wherein suction members carried by another cylinder and rotatable therewith engage the articles and carry the articles away from the stripping nip and in a path around a portion of the periphery of the other cylinder.

Yet another object of the present invention is the provision of a new and improved material processing apparatus for separating waste and articles cut from sheet material and including a pair of rotary cylinders, one of which engages the waste and carries the waste around at least a part of the circumference of the cylinder and a second cylinder which includes first means which engages the first articles advanced through the stripping nip and carries those articles away from the stripping nip and releases those articles for conveyance away from the cylinder in a first path, and second means which engages the second articles which are advanced through the stripping nip and carries those second articles around the circumference of the cylinder and away from the stripping nip and releases those second articles for movement in a second path away from the stripping nip.

A further object of the present invention is the provision of a new and improved material processing apparatus which includes a sucker cylinder carrying a plurality of sucker members operable to engage articles adjacent said cylinder, and wherein the cylinder is constructed of a removable sheath which has a plurality of openings therein through which preselected sucker members operate so that these preselected sucker members only engage the articles with the other sucker members located interiorly of the sheath.

A still further object of the present invention is the provision of a new and improved material processing apparatus, as noted in the next preceding object, wherein a plurality of sucker members are carried on a bar which extends axially of the cylinder, and wherein the bar carries on its outer end a cam actuated member which, when operated, opens a valve for communicating vacuum to the sucker members and wherein the cam actuated member and bar are adjustable together about the circumference of the cylinder in order to adjust the location of the sucker members and cam actuated member so as to engage the articles and actuating cam, respectively, at the desired time in the rotation of the cylinder.

Still a further object of the present invention is the provision of a new and improved material processing apparatus which includes a cylinder for removing waste from sheet material conveyed therepast and which includes a plurality of pin members which engage the leading edge of the waste material for conveying the waste material around the periphery of the cylinder and which are releasable to release the waste material after it has been conveyed at least in part around the circumference of the cylinder, and wherein the pin members are carried on a bar which extends axially of the cylinder and which is movable radially so as to extend and retract the pin members carried by the bar by means of a suitable and simple linkage arrangement.

Another object of the present invention is the provision of a new and improved material processing apparatus which includes a cylinder for removing waste from sheet material delivered thereto and wherein the cylinder is substantially hollow and has a vacuum applied therein and the outer periphery of the cylinder has a plurality of openings therein which correspond with the locations of cutout waste portions of the sheet material to be removed so that the cutout waste portions of the sheet material are drawn through the openings in the cylinder and into the interior thereof.

Still another object of the present invention is the provision of a new and improved material processing apparatus, as noted in the next preceding paragraph, wherein the waste which is drawn into the interior of the cylinder is also drawn axially of the cylinder into a waste receiving conduit which carries the waste material away from the cylinder.

Yet another object of the present invention is the provision of a new and improved material processing apparatus wherein a pair of rotary cylinders cooperate to effect cutting of sheet material into waste and articles as the material is advanced through the nip defined by the cylinders and wherein a second pair of rotary cylinders cooperates to effect a separation of the waste and articles, and wherein the articles are delivered selectively into one of a pair of paths by one of the second pair of rotary cylinders to effect a classification or sorting of the articles and wherein the pair of paths are defined by a plurality of conveyors which operate at a speed substantially slower than the surface speed of the second pair of cylinders and which cooperate to move the items laterally so as to provide a lateral separation between the items.

A further object of the present invention is the provision of a new and improved material processing apparatus which includes a skewing conveyor means for laterally separating articles conveyed by the conveyor means and wherein the conveying means comprises a plurality of laterally spaced tape conveyors which are supported at their opposite ends for separate adjustment laterally and wherein the adjustment can be effected without breaking the drive connection to the tapes.

A still further object of the present invention is the provision of a new and improved material processing apparatus, as noted in the next preceding object, wherein the drive to the tape conveyors comprises a belt which cooperates with respective drive pulleys for each of the tape conveyors and wherein each of the pulley members is movable relative to the belt for adjustment purposes and without breaking the drive engagement between the belt and the pulley member.

A still further object of the present invention is the provision of a new and improved material processing apparatus which includes a skewing conveyor means for conveying and laterally separating the conveyed articles, and wherein the conveying means includes a plurality of tapes which drivingly engage the opposite sides of each of the articles in order to convey the articles between the tapes, and wherein the output end of the tapes is adjustable so as to change the direction of delivery of the articles from the output end of the tapes.

Another object of the present invention is the provision of a new and improved sheet material processing apparatus which includes a pair of rotary cylinders defining a cutting nip and in which sheet material is cut into a plurality of rows of laterally adjacent articles and waste, and a pair of separator rolls defining a stripping nip therebetween which separates the laterally spaced articles from the waste, and wherein the articles in each row are delivered into a separate path for movement away from the separator rolls, and wherein the separate paths of movement are defined by skewing conveyor means which laterally separate the articles and which deliver the articles to a shingling and stacking unit which is operable to shingle the articles and effect a separate stacking of the articles in each of the paths.

Still another object of the present invention is the provision of a new and improved material processing apparatus which is operable to shingle box blanks and stack the box blanks which are delivered thereto, and which includes a conveyor moving at a speed slower than the speed of delivery of the box blanks to the conveyor and an adjustable stop member which functions as a stop against which the leading edge of the box blanks are delivered.

A further object of the present invention is the provision of a new and improved material processing apparatus, as noted in the next preceding paragraph, wherein the conveyor is movable in a vertical direction for adjustment purposes and the stop is likewise adjustable along the conveyor for engaging different length articles and wherein the stacking is effected by providing trays at the output end of the conveyor for receiving the shingled articles which are conveyed off the end of the conveyor.

Further objects and advantages of the present invention will be apparent to those skilled in the art to which it relates from the following detailed description of the preferred embodiment thereof made with reference to the accompanying drawings forming a part of this specification and in which:

FIG. 1 is a schematic side elevational view of a material processing apparatus embodying the present invention;

FIGS. 2–4 are schematic fragmentary views illustrating different operative positions of a portion of the apparatus of FIG. 1;

FIG. 5 is a fragmentary plan view illustrating the material on which the apparatus of FIG. 1 operates;

FIG. 6 is a fragmentary side elevational view of a portion of the apparatus shown in FIG. 1 on an enlarged scale;

FIG. 8 is a fragmentary sectional view, partly in elevation, of the apparatus shown in FIG. 7, taken approximately along the section line 8—8 of FIG. 7;

FIG. 9 is a fragmentary sectional view of the apparatus shown in FIG. 8, taken approximately along the section line 9—9 of FIG. 8;

FIG. 10 is an enlarged fragmentary sectional view of the apparatus shown in FIG. 8;

FIG. 11 is a fragmentary sectional view of the apparatus shown in FIG. 6, taken approximately along the section line 11—11 of FIG. 6, and with portions thereof shown in elevation;

FIG. 12 is a sectional view of the apparatus shown in FIG. 11, taken approximately along the section line 12—12 of FIG. 11;

FIG. 13 is a sectional view of the apparatus shown in FIG. 11, taken approximately along the section line 13—13 of FIG. 11;

FIG. 20 is a side elevational view of still another portion of the apparatus shown in FIG. 1 and on an enlarged scale;

FIG. 21 is a fragmentary end elevational view of a portion of the apparatus shown in FIG. 20, looking at the apparatus of FIG. 20 from the left;

FIG. 22 is a sectional view of the apparatus shown in FIG. 20, taken approximately along the section line 22—22 of FIG. 21; and FIG. 23 is a schematic side elevational view of a material processing apparatus embodying the present invention.

Figure 7:
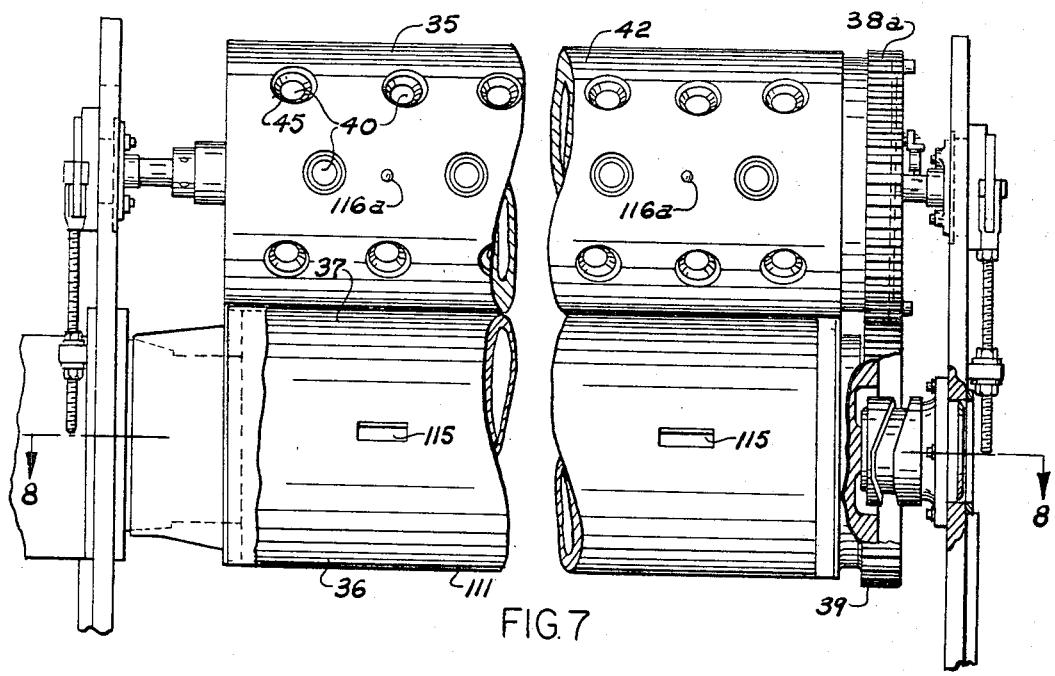
FIG. 7 is a view partly in section of the portion of the apparatus shown in FIG. 6, looking at the apparatus of FIG. 6 as indicated by the line 7—7.

The present invention provides an improved material processing apparatus for processing sheet material. In general, the apparatus is operable to handle material in sheet form and to cut the material into laterally adjacent articles and waste. After the material is cut into the waste and adjacent articles, the waste and articles are separated. The articles are then fed to a location where they may be stacked and in the event different types of articles are being cut from the material, the different articles may be delivered to different stacking locations. The preferred embodiment of the present invention to be described hereinbelow is especially adapted for use in the formation of carton or box blanks from sheet material and is an extremely high-speed and reliable mechanism.

As representing the preferred embodiment of the present invention, FIG. 1 illustrates a material processing appararatus 10 for use in forming and handling carton blanks. The material processing apparatus 10 includes, in general, a cutting unit 11 at which sheet material is cut into carton blanks and waste. The material cut into the carton blanks and waste is delivered from the material cutting unit 11 into a separator unit 12. The separate unit 12 is operable to separate the carton blanks and waste and deliver the carton blanks to a skewing conveyor unit 13. The skewing conveyor unit 13 is operable to laterally separate the carton blanks which are cut from the material and to deliver the carton blanks to a shingling and stacking unit 14 which is operable to shingle the carton blanks and stack the carton blanks for removal from the apparatus.

Preferably, the sheet material which is processed by the processing apparatus 10 is cardboard sheet material having the outline of a plurality of carton blanks printed thereon in closely spaced relation and lying in rows on the material with each row extending transverse to the feed of the material. The sheet material is thus cut providing a plurality of carton blanks spaced immediately adjacent to each other and in a row and are fed through the apparatus in this manner. The sheet material is so dimensioned that a plurality of rows of carton blanks are cut from the sheet.

A portion of a sheet which is to be processed by the apparatus 10 is shown in FIG. 5. The arrow 15 shown in FIG. 5 indicates the direction of feed of the material. The sheet is provided with two rows, designated 16, 17 of printed carton blank images, designated 18. The printed images 18 are arranged in the rows 16, 17 in the desired number, and only two carton blanks are shown in each of the rows 16, 17. The printed images 18 are arranged on the sheet material in a so-called "reverse nested" arrangement, that is, where projections 19 of the images in row 16 coextend with similar projections 20 of the images in the row 17. This coextension of these projections is provided by reversing the direction the images in the row 17 face from those in row 16.

Each of the printed images 18 contains an area, designated A, which may be termed an "internal area" and which will become waste material. The portions A may be termed "internal waste" and are illustrated by way of example only. Depending upon the type of carton blank and its configuration, such internal waste may constitute a variety of things, as will be discussed hereinbelow. The portion 21 of the sheet material which surrounds the printed images 18 constitutes waste material as well and may be termed "external waste."

As noted hereinabove, the material processing apparatus 10 is operable to cut the images 18 which constitute carton blanks from the sheet and to separate the carton blanks from the internal and external waste. The processing apparatus is also operable to feed the carton blanks forming the row 16 along one feed path for stacking purposes and the carton blanks in the row 17 along a different path for stacking thereof separately from the carton blanks forming the row 16, all of which will be apparent from the description hereinbelow.

CUTTING UNIT

As noted hereinabove, the sheet material is cut into waste material and carton blanks in the cutting unit 11. In the preferred embodiment, the sheet material is delivered in a registered relation to the cutting unit 11 by any suitable feed arrangement, designated generally by the reference numeral 25. The cutting unit 11 includes a pair of rotary cylinders 26, 27 which have their peripheral surfaces rotating adjacent to each other to define a cutting nip 28 therebetween. The sheet material is cut as it is advanced through the cutting nip 28.

The cylinders 26, 27 carry projecting members which engage the material so as to effect the cutting thereof, as well as creasing thereof, as desired. In the preferred embodiment, the cutting and creasing is effected by a plurality of projecting lands 30 which are carried by flexible plates or dies 31, 32 fixedly secured to the cylinders 26, 27. Certain of the projecting lands cooperate to effect a cutting of the material, while other projecting lands, not shown, cooperate to effect a creasing of the material. The cutting, of course, is provided so as to properly cut the material at the desired location in registered relationship with the printed image 18 on the sheet material. The material is also creased in the desired location so that the carton blanks may be folded so as to form the desired carton. The specific construction of the flexible plates or dies 31, 32 and the specific cutting and creasing modes are known and disclosed in the United States patent issued to Downie, No. 3,142,233, and thus will not be described in detail herein.

The leading edge of the sheet material, after it is advanced through the cutting nip 28 defined by the cylinders 26, 27, is advanced and guided into the stripper unit 12. The particular guiding mechanism may take any form, but is shown in the drawings as including a tape conveyor mechanism, generally designated 33, and which includes upper and lower conveyor runs which engage the opposite sides of the material along the width of the material so as to guide and assist in conveying the material from the cutting unit 11 into the stripper unit 12.

STRIPPER UNIT

The stripper unit 12, as noted above, receives the sheet material from the cutting and creasing unit 11 and is operable to separate the cut articles, namely, the carton blanks, and the waste. The stripper unit 12 includes a pair of rotary cylinders 35, 36 which cooperate to effect a separation of the carton blanks and waste delivered thereto. The cylinders, 35, 36 rotate adjacent each other and define therebetween a stripping nip 37. The material which is guided from the cutting unit 11 by the guide and conveyor means 33 is received in the stripping unit 12 on a guide plate 38 which functions to guide the leading edge of the material into the stripping nip 37.

The particular positioning of the rolls 35, 36 relative to the cutting rolls 26, 27 is such that the stripping nip 37 is spaced a distance from the cutting nip 28 which is less than the length of the sheet material being processed, as measured in the feeding direction. Thus, the leading edge of the sheet material is located in the stripping nip 37, while the trailing portion of the sheet is still located in the cutting nip 28. By this construction, the sheet is maintained in registry and under control so that the leading edge of the sheet does not skew or move so that the sheet is misregistered when it arrives in the stripping nip 37.

The rotary cylinders 35, 36 which cooperate to separate the articles and the waste material are of the same size as the cutting and creasing cylinders 26, 27 and are driven at substantially the same surface speeds as the cutting and creasing cylinders, and are integrated therewith by drive mechanism, not shown. The cylinders 35, 36 have intermeshing gears 38a, 39 so as to be driven at identical surface speeds.

The upper cylinder 35, as shown in the drawings, may be termed a "carton blank" cylinder, and the lower cylinder 36 may be termed a "broke" cylinder. The upper cylinder 35 is operable to engage and carry the articles or carton blanks which have been cut from the sheet material and is operable to carry those carton blanks in a path around the periphery of the cylinder upwardly and away from the stripping nip 37. The carton blanks are then released from the cylinder 35 and delivered into conveying means for conveying the carton blanks away from the stripper unit 12 and into the skewing unit 13. The cylinder 35 is operable to deliver the cartons in each row 16, 17 into a different path for delivery from the stripper unit 12 and into the skewing unit 13, as will be described in detail hereinbelow. The broke cylinder 36 is operable to remove the waste of the sheet material from the stripping nip 37. Thus, the cylinders 35, 36 cooperate to separate the carton blanks from the waste by moving the carton blanks in one directtion away from the stripping nip 37 and by moving the waste material in another direction away from the stripping nip 37.

As noted hereinabove, the carbon cylinder 35 is operable to engage each of the carton blanks and convey the carton blanks away from the stripping nip 37 and to release the carton blanks for delivery from the stripper unit 12. The carton cylinder 35 is shown in detail in FIGS. 11–14. The carton cylinder 35 includes a plurality of sucker members 40 which are operable to engage the carbon blanks which are advanced into the stripping nip 37 and grip the carton blanks to convey the carton blanks in a path around the periphery of the cylinder 35 upon rotation of the cylinder 35.

The sucker members 40 are arranged in sets and each set includes a plurality of sucker members spaced axially of the cylinder and carried on a supporting member or bar 41. Any number of such bars may be provided and ten bars are provided in the preferred embodiment, thus providing ten sets of suckers spaced axially of the cylinder. Four such bars are shown in FIG. 12 and designated 41a, 41b, 41c, 41d. Each bar 41 may be moved circumferentially of the cylinder in order to position the bar in any circumferential position.

The cylinder 35 also includes a surrounding sheath 42 which comprises a flexible sheet of metal which is bent to the circumference of the cylinder and is secured at its opposite ends by fastening means 43, 44, respectively, as shown in FIG. 12. The inner surface of the sheath 42 engages the sucker members 40 and provides a sealing connection therewith so that any vacuum drawn into the sucker members is sealed. Thus, the sheath member 42 actually functions as a seal for preselected sucker members and renders such preselected sucker members inoperative.

Certain of the sucker members 40 are effective to engage the carton blanks so as to carry the carton blanks therewith. The sucker members which are operative project through suitable openings 45 in the sheath 42. Thus, only those sucker members 40 which have openings 45 adjacent thereto will be operative to engage the carton blanks. The particular sucker members 40 which are effective to engage the carton blank are those which are positioned and located on the cylinders such that they will engage the carton blanks in a surface area thereof so as to secure the carton blank thereto. Those sucker members which are located so as to engage the carton blank at a cut line or so as to engage the waste material are not rendered operative and no openings are provided in the sheath 42 adjacent those sucker members so that such sucker members remain inoperative. However, for a job where the carton blank shape and size are different, a different sheath 42 is provided having different openings 45 in the outer periphery thereof, thereby rendering different sucker members 40 operative. Thus, by varying the sheath 42, different suckers are rendered operative for different jobs.

As noted hereinabove, the sucker members are arranged in sets with each set mounted and carried by a bar 41. Since each set is of substantially identical construction, only one set will be described in detail, the operation of the other sets being identical therewith. The bar 41 which carries a set of sucker members 40 extends axially throughout the length of the cylinder. The bar 41 has an axially extending groove 42 therein. The groove 42 is adapted to have suction or air pressures applied thereto and communicates with each of the sucker members carried by the bar. The opposite ends of the groove 42 cooperate with suitable valve means, designated 46, 47, respectively. The valve 46 functions, when open, to provide a vacuum in the conduit 42 and thereby applies a vacuum in each of the sucker members 40. The valve 47 is operable, when open, to communicate air pressure into the conduit 42 and thereby provides a blast of air through each of the sucker members 40 when open. The valve means 46, 47 are identical in construction and only the valve 46 will be described hereinbelow.

Figure 14:
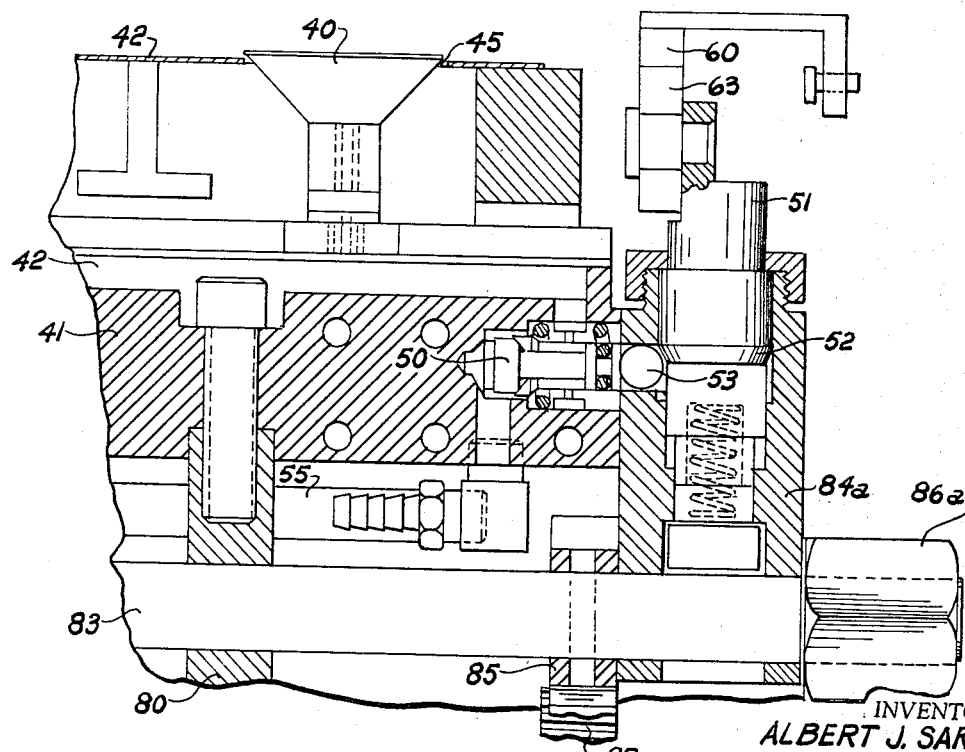
FIG. 14 is an enlarged sectional view of a portion of the apparatus of FIG. 11.
Figure 15:
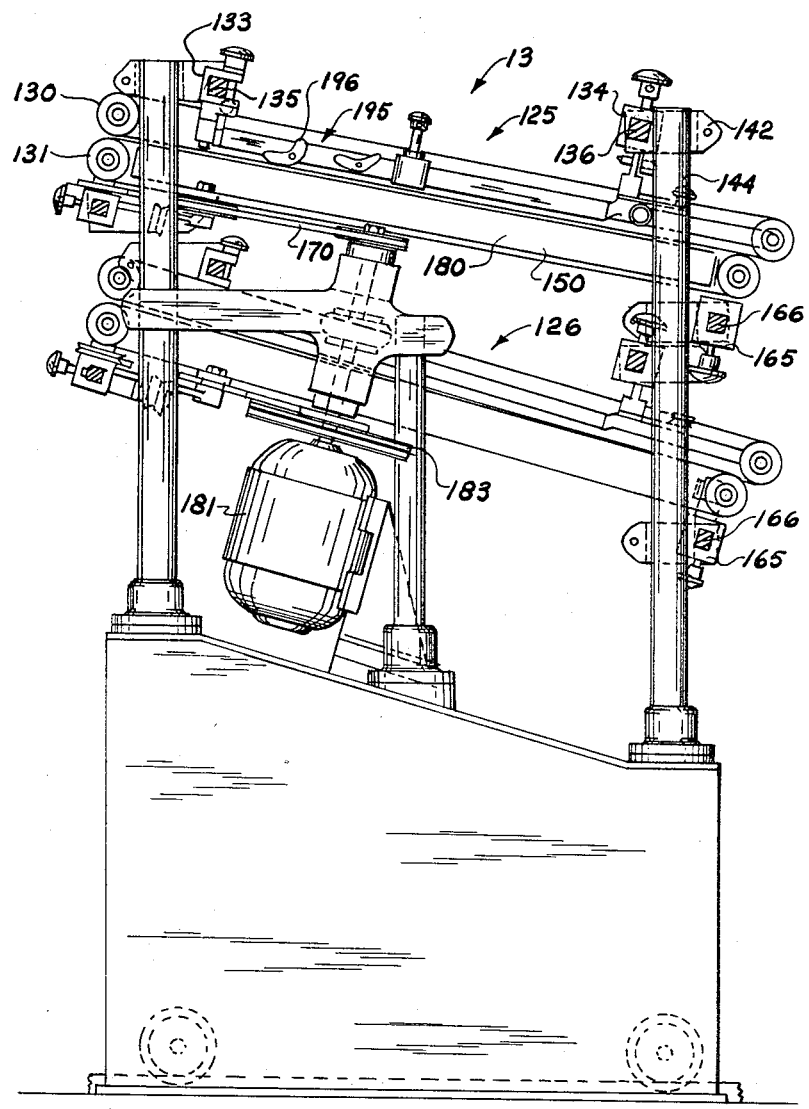
FIG. 15 is a fragmentary side elevational view of another portion of the apparatus shown in FIG. 1.

The valve 46, best seen in FIG. 14, includes a valve member 50 which is biased into a closed position and may be moved to an open position by an actuator 51. The actuator 51 comprises a vertically movable rod member biased radially outwardly of the cylinder 35 and upwardly, as viewed in the drawings, engages a ball member 53 and moves the ball member 53 toward the left, as viewed in FIG. 14, thereby moving the valve member 50 to its open position. When the valve member 50 is moved to its open position, the conduit 42 is placed in communication with a conduit 55. The conduit 55 communicates with a vacuum chamber 56 contained in a central shaft 57 of the cylinder 35. Vacuum is applied to the vacuum chamber 56 by means of a suitable vacuum line 58. Thus, it should be apparent that upon downward movement of the member 51, the conduit 52 is provided with suction therein and the sucker members carried by the bar associated with the conduit 42 are provided with suction.

The control member 51 is moved radially inwardly of the cylinder 35 by means of a fixed cam 60 carried by the frame 61 of the stripper unit 12. The cam 60 may be positioned adjacent to the cylinder 35 and is operable to engage roller 63 carried by the actuating member 51 and to move the roller and thereby move the actuating member 51 downwardly, as viewed in the drawings, and thereby open the valve. When the roller 63 passes beyond the cam member 60, the roller is raised to its previous position due to the bias on the actuating member 51 thereby permitting the valve member 50 to move to the closed position, thus disconnecting the sucker members from the vacuum therein.

As noted hereinabove, the valve 47 also controls the fluid pressure in the conduit 42. The valve 47 provides for communicating an air pressure to the conduit 42 in a manner similar to that described hereinabove with relation to the application of vacuum to the sucker members 40. The valve 47, is not shown in detail, but when in an open condition connects a conduit 70 with the conduit 42. The conduit 70 communicates with an air chamber 71 contained in the central shaft 57 of the cylinder 35. Air pressure is constantly maintained within the air chamber 71 by means of a conduit 72 which is connected with a source of air pressure and with the chamber 71. The valve 47 is moved to its open position by means of a cam connected with the frame of the apparatus and which engages a roller 73 carried by an actuating member 74. When the roller 73 engages the cam, the actuating member 74 moves to open the valve 47 and causes air pressure to be provided in the conduit 42. The air pressure is provided in the conduit 42 at a time so as to be effective to blow the carton blanks off the sucker members at the desired movement in the operation of the stripper unit.

From the above description, it should thus be apparent that certain sucker members 40 are operable to engage carton blanks which have been cut from the sheet material. These sucker members which engage the carton blanks have suction applied thereto at a predetermined time in the rotation of the cylinder 35 by actuation of the valve 46. The sucker members which are rendered operative to engage the carton blanks carry the carton blanks away from the stripping nip 37 and along the path of rotation of the outer circumference of the cylinder 35. At the desired time in the rotation of the cylinder 35, the valve 47 is actuated and a blast of air is directed through the sucker members which engage the carton blanks to blow the carton blank off the sucker members.

Since the cylinder 35 is operable to deliver carton blanks in row 16 in one path and carton blanks in row 17 in a separate and different path, it is necessary to properly position the cam members for controlling valves 47 to apply an air pressure therein to release the carton blanks at the proper time. The carton blanks in each row 16, 17 will, of course, be released at different times, and the cams for actuating valves 47 are located so as to effect this release at the desired time. Moreover, it should be apparent that the sucker members on more than one bar 41 may be used for engaging a given row of carton blanks and directing that row into the desired output path.

As described hereinabove, the sucker members 40 are carried in sets by bars 41 which are spaced circumferentially around the cylinder 35. Each of the bars 41 is adjustable around the periphery of the cylinder so as to locate the sucker members carried thereby in the desired location for engaging the carton blanks in the proper location as desired. To this end, each of the bars 41 is carried by spaced radially extending plate members 80. As shown in the drawings, three plate members 80 carry each bar 41. The plate members 80 have a base portion which encircles and is rotatable about a center shaft 81 of the cylinder 35. The bars 41 are suitably secured to the sets of plate members 80 which support the respective bars. FIG. 11 illustrates a plurality of plates, namely, ten, at each end of the shaft 81 and a plurality, namely, ten, in the center of the shaft. The ten plates at each of these locations support one of the ten bars 41 which are spaced around the periphery of the cylinder 35. However, for purposes of illustration only the plates 80 for supporting one bar 41 are shown extending away from the shaft 81 and the other plates are shown only in cross section in FIG. 11.

The plates 80 for supporting one bar 41 have aligned openings therein through which a rod member 83 extends. There is a separate rod member 83 which extends through openings in each set of three plates which support each bar 41. The rod member 83 carries at its left end, as viewed in FIG. 11, a pinion member 84 and at its right end, carries a similar pinion member 85. The pinion members 84, 85 are fixed to the rod member and the rod member 83 is rotatable relative to the plates 80 in the openings through which it extends. The rod member 83 also carries the actuator members 51, 74 on the opposite outer ends thereof and is rotatable relative to and extends through actuator member housings 84a for the actuator members 51, 74. On the outermost end of the rod member 83, as shown in FIG. 11, a nut 86a is fixedly connected. The nut 86a is adapted to be engaged by a suitable tool so as to rotate the rod member 83 relative to the plates 80 and relative to the housing members 84a for carrying the actuator members 51, 74.

When the rod member 83 is rotated, the pinion members 84, 85 are likewise rotated. The pinion members 84, 85 mesh with fixed gears 86, 87 which are fixed for rotation with the shaft portion 81 of the cylinder 35. The gears 86, 87 thus normally rotate along with pinions 84, 85 about the axis of the shaft 81. However, when the pinions 84, 85 are rotated upon turning of the nut member 86a on the rod 83, the pinion members 84, 85 walk around the gears 86, 87. When the pinion members 84, 85 walk around the gears 86, 87, the pinion members carry the rod 83 therewith, and the housings 84a for the actuators 51, 74 move with the pinions around the gears 86, 87. This causes movement of the plates 80 which in turn carry the bar 41 and the sucker members 40 carried by the bar 41 around the periphery of the cylinder 35. Thus, by rotating the nut 86a, adjustment of the bar 41 around the periphery of the cylinder, and thereby adjustment of the suckers 40 around the periphery of the cylinder, may be effected. Simultaneously with the adjustment of the cylinders, the actuator members are also adjusted so as to properly engage the cam for energizing the air and vacuum for the sucker members carried by the bar.

The cylinder 36 of the stripper unit 12, as noted hereinabove, is effective to move the waste material from the stripping nip 37, and may be referred to as the "broke" cylinder. The broke cylinder 36 is operable to remove the external waste, as well as the internal waste, of the sheet material away from the stripping nip 37. The external waste, as noted above, may be referred as the waste which extends around the carton blanks which have been cut from the sheet material and is designated 21, while the internal waste consists of those cutout areas, such as the area designated A in FIG. 5, and any other such areas which have been completely cut from the main body of the surrounding material. The broke cylinder 36, while operable to remove both the internal broke or waste and the external waste, operates in different manners to remove the internal and external waste.

The broke cylinder 36 includes a means for engaging the external waste 21 at the leading edge of the sheet material and carries the leading edge of the external waste around the periphery of the cylinder upon rotation of the cylinder and away from the stripping nip 37. The means for engaging the external broke or waste comprises a plurality of pins 90 which are movable radially of the cylinder 36 into engagement with the leading edge of the sheet material and penetrate the leading edge of the sheet material in the waste area, as shown in FIG. 2, and then convey the leading edge of the waste downwardly, as viewed in the drawings, and away from the stripping nip 37.

The pins 90 thus are effective to convey the external waste downwardly away from the stripping nip 37, while at the same time the sucker members 40 are moving the carton blanks upwardly away from the stripping nip 37 and in a direction opposite that of the movement of the external waste by the pins 90. In this manner, a clean separation is effected between the external waste and the carton blanks. After the external waste has been advanced a predetermined distance around the periphery of the cylinder 36, the pins 90 move radially inwardly of the cylinder 36 and release the waste so that the waste then projects or hangs downwardly away from the cylinder 36 and eventually falls beneath the cylinder 36, as shown in FIG. 4.

The pins 90 which move radially inwardly and outwardly of the cylinder 36 to engage the leading edge of the external waste are carried by a bar 91 which extends axially of the cylinder. The bar 91 is supported for radial movement inwardly and outwardly of the cylinder 36 and has a plurality of slot-like openings 92 therein through which guide pins 93 extend. The openings 92 permit movement of the bar relative to the guide pins 93 in a radial direction. The pins 90 are carried by and connected with the bar 91 in any suitable manner and when the bar 91 moves, the pins 90 likewise move.

The bar 91 is moved radially by a connecting linkage which includes a plurality of links 95 pivotally connected to the bar 91 at one end and pivotally connected at their other end to a beam member 96 which extends along the axis of the cylinder. The beam member 96 is supported in the cylinder 36 for reciprocating axial movement and is guided for reciprocating movement by a guide bar 97 and guide blocks 98 which engage the beam 96 on opposite radial sides thereof. As noted hereinabove, the beam 96 is movable in an axial direction with respect to the cylinder 36 and effects movement of the links 95 therewith and which in turn cause movement of the bar 91 radially inwardly and downwardly of the cylinder 36.

The beam 96 is moved or reciprocated axially of the cylinder by means of a cam 100 which is supported in the stripper unit 12 along the side thereof. The cam 100 is fixed against axial movement and is secured in a groove 101 in a sleeve 102 which has a flange portion 103 which is secured to the frame of the stripper unit. The beam 96 carries on its end adjacent to the cam 100 a cam follower 104 in the form of a roller which engages in a cam groove 105 in the cam 100. Upon rotation of the cylinder 36, the cam follower 104 rolls in the cam groove 105 and relative thereto and in so rotating, the cam effects axial reciprocation of the beam 96 and movement of the pin members 90 inwardly and outwardly at the desired time so as to engage the leading edge of the sheet material being processed by the apparatus and to carry that leading edge, which constitutes waste material, downwardly away from the stripping nip.

As noted above, the cylinder 36 is also operable to remove the internal waste of the sheet material away from the stripping nip 37 and carton blank. The cylinder 36 is constructed so as to effect removal of the internal waste by means of suction. The cylinder 36 is a hollow cylinder which defines a hollow suction chamber 110 therein. The chamber 110 is defined by a circular sheath 111 which extends circumferentially and comprises the outer peripheral surface of the cylinder 36. The sheath 111 is supported at its opposite axial ends by support flanges 112, 113 and the opposite circumferential ends of the sheath 111 are secured by suitable clamps 115a, 116, respectively, to a support plate 117 which also supports the bar 91 and beam 96, described hereinabove.

The sheath 111 is similar to the sheath 42 described hereinabove in connection with the carton cylinder 35 in that it is a flexible metal sheet which is bent to the circumference of the cylinder 35 and held in such a condition by the clamps 115a, 116. The sheath is provided with a plurality of openings 115 therein which communicate with the interior chamber 110. The openings 115 in the cylinder 36 are positioned therein so as to be in register with the areas of the sheet material which constitute internal waste when the cylinder 36 is rotating and the material is being advanced therethrough. In the embodiment shown in the drawings, the openings 115 are positioned so as to correspond and overlap with the areas A of the sheet material.

The interior suction chamber 110 of the cylinder 36 is placed under vacuum and the chamber 110 of the cylinder 36 at the axial end thereof communicates with a source of vacuum through a suitable conduit 118. The conduit 118 communicates with a connecting chamber portion 119 which connects the conduit 118 with the chamber 110. The connecting chamber portion 119 extends through a side frame of the stripper unit and is rotatable relative thereto.

From the above, it should be apparent then that the internal waste due to the vacuum in the chamber 110 is drawn through the openings 115 in the sheath 111 and into the chamber 110 and then is moved in a generally axial direction relative to the cylinder 36 through the connecting chamber portion 119 and into the conduit 118. In this manner, the waste which constitutes internal waste is removed from the sheet material. It should also be apparent that any segments or sections of waste material may be removed from the stripping nip 37 through an opening 115 in the sheath 111, as described hereinabove, and such constitutes internal waste regardless of where the section of waste is located on the sheet material. In this connection, it has been found to be advantageous to cut from the trailing edge portion of the external waste a waste segment which is removed through an opening in the sheath 111. It has been found that by such operation the separation of the waste from the carton blanks is facilitated.

In order to assist in the removal of the internal waste through the broke cylinder, the carton cylinder 35 may be provided with projecting means thereon which engage the internal waste to be removed through the openings 115. The projecting means, as shown in FIGS. 2 and 7, comprises lug members 116a suitably secured to the sheath 42 of the carton cylinder 35 and projecting therefrom. These lug members 116a are preferably made of a rubber-like material and engage the upper portion of the waste segments A constituting the internal waste and force those segments through the openings 115 in the broke cylinder, best shown in FIG. 2A. In this manner, the projecting lug members 116a assist in the removal of the internal waste.

After the carbon blanks and waste have been separated by the cooperative action of the carton cylinder 35 and the broke or waste cylinder 36, the carton blanks are conveyed through one of two paths of movement, as noted above. The separate paths of movement are provided for classification or sorting purposes so that the carton blanks of one type, job, or orientation follow one path of movement, whereas carbon blanks of a different type, job, or orientation may follow the other path of movement. The carton cylinder 36 is operable to release the carton blanks of different job types, or orientation of the different rows 16, 17 at different times, depending upon the path of movement they are to follow.

The stripper unit 12 includes a pair of conveyor mechanisms 120, 121 and which receive the carton blanks from the carton cylinder 35. The conveyor mechanisms 120, 121 receive the carton blanks of one row 16, 17 only. Thus, a separation of the carton blanks of each row 16, 17 is effected.

The conveyor mechanism 120 is located above the conveyor mechanism 121 and includes a pair of conveyor belts which define a nip and into which the leading edge of the carton blanks of one row is introduced by the sucker members 40. After the leading edges of the carton blanks are received in the conveyor unit 120, the conveyors cooperate to grip the carton blanks and feed the carton blanks outwardly away from the cylinders 35, 36, and toward the skewing conveyor unit 13. The nip of the conveyor unit 120 is located substantially tangential to the periphery of the cylinder 35 so as to readily receive the leading edges of the carton blanks.

In the same manner, as described above in connection with the conveyor unit 120, the conveyor unit 121 receives the leading edge of alternate carton blanks received in the nip 37 from the carton cylinder 35. Once the leading edges of the carton blanks are received in the conveyor unit 121, they are engaged thereby and conveyed away from the cylinders 35, 36. However, in order to properly receive the leading edges of the carton blanks, the nip of the conveyor unit 121 is located so as to extend substantially tangential to the periphery of the cylinder 35. When the carton blanks are received in the conveyor unit 121, the carton blanks then are conveyed away from the cylinders 35, 36.

In order to assist the introduction of the leading edges of the carton blanks into the conveyor units 120, 121, suitable airblast mechanisms may be located so as to blow air on the leading edges of the carton blanks and thereby assist in directing the leading edges of the carton blanks into the nips of the conveyor units 120, 121. Such airblast means are shown in FIG. 6 and constitute air knives 125 in the form of conduits with openings therein. The conduits extend along the axis of the cylinder 35 and are spaced therefrom and a blast of air may be directed through the openings therein in the desired time sequence when the leading edges of the carton blanks are in position so as to be guided thereby. The conveyor units 121, 120, are, preferably, and in the present embodiment, driven at a speed equal to the surface speed of the cylinders 35, 36 and are connected therewith by suitable drive mechanism to be driven thereby. These conveyor units 120, 121 are the initial conveyor units for the separate paths of movement for the carton blanks through the apparatus, and each of these units 120, 121 delivers the carton blanks conveyed thereby to separate conveyor mechanisms in the skewing conveyor unit 13.

THE SKEWING CONVEYOR UNIT

As noted hereinabove, the carton blanks which are cut from the sheet material are located immediately adjacent to each other in a side-by-side relation and in the preferred embodiment, as shown in FIG. 5, the carton blanks have a common cut line 19a which extends parallel to the direction of travel of the carton blanks, and thus the carton blanks are substantially laterally abutting. As should be apparent from the description hereinabove, there is no lateral separation of the carton blanks due to the operation of the stripper unit 12 and the carton blanks are then received by the skewing conveyor unit 13 in a very close, laterally spaced relation. The skewing conveyor unit 13 is operable to separate the carton blanks laterally so that the carton blanks may be readily and easily shingled and stacked without interference between adjacent carton blanks.

The skewing conveyor unit 13 includes an upper tier of conveyors 125 for receiving carton blanks from the upper conveyor unit 120 of the stripper unit. The skewing conveyor unit 13 also includes a lower tier of conveyors 126 which receive the carton blanks from the conveyor unit 121. The upper tier of conveyors 125 includes a plurality of tape conveyors 130 which engage the upper side of the carton blanks delivered thereto and a plurality of tape conveyors 131 which engage the underside of the carton blanks conveyed thereto.

The tape conveyors 130 are mounted in pairs on a support carriage 132 which is connected at its opposite ends with block members 133, 134, respectively. The block members 133, 134 are carried on rod members 135, 136, respectively, which extend transversely of the apparatus. The bar member 135 is connected at its opposite ends to collar members 138, 139, respectively. The collar members 138, 139 are connected to vertical posts or support members 140, 141, respectively. The collar members are adjustable vertically along the posts 140, 141. The rod member 136 is also secured at its opposite ends to collar members 142, 143, respectively. The collar member 142 is adjustably connected with a vertically extending post 144 and the colllar member 143 is likewise secured to a vertically extending post 145 for adjustment vertically thereof.

Figure 16:
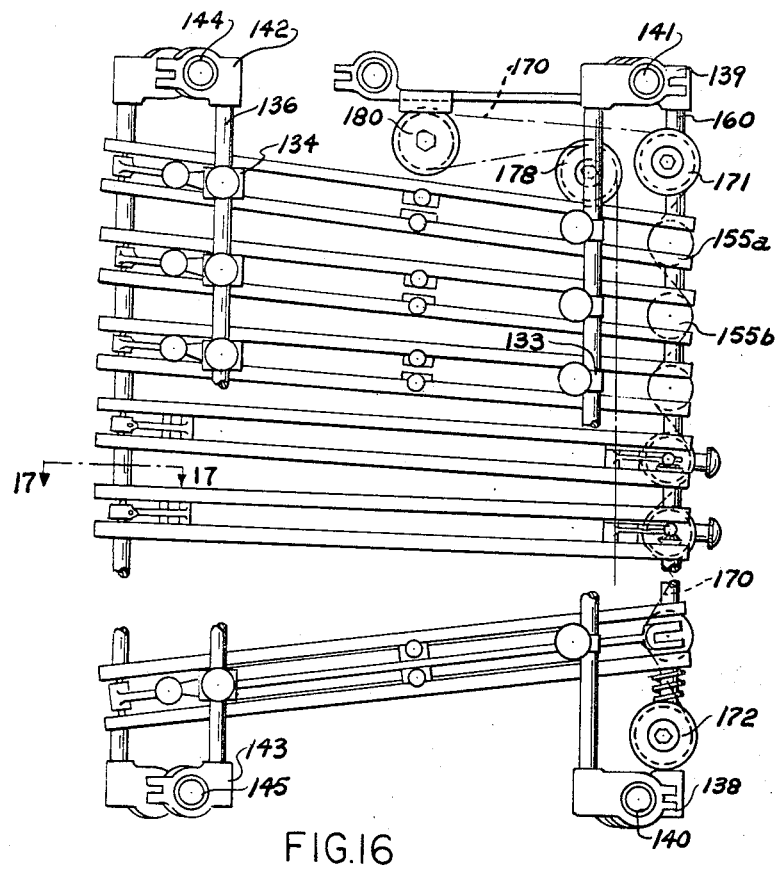
FIG. 16 is a top schematic view of the apparatus shown in FIG. 15.
Figure 17:
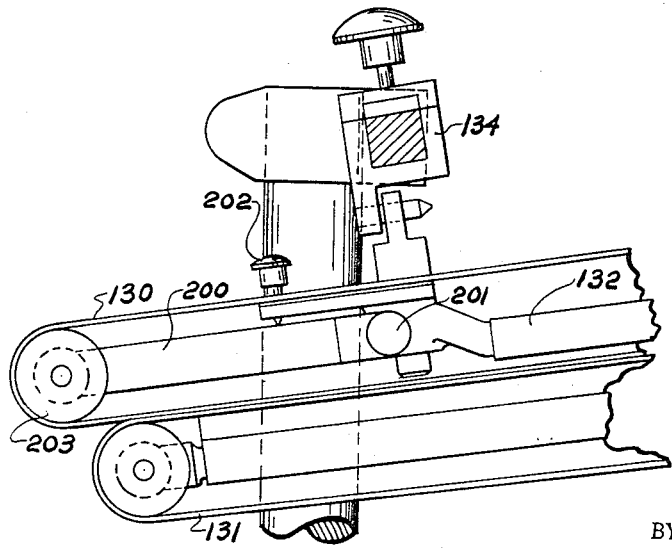
FIG. 17 is a fragmentary sectional view, looking at the apparatus of FIG. 16 approximately along the section line 17—17 thereof.
Figure 18:
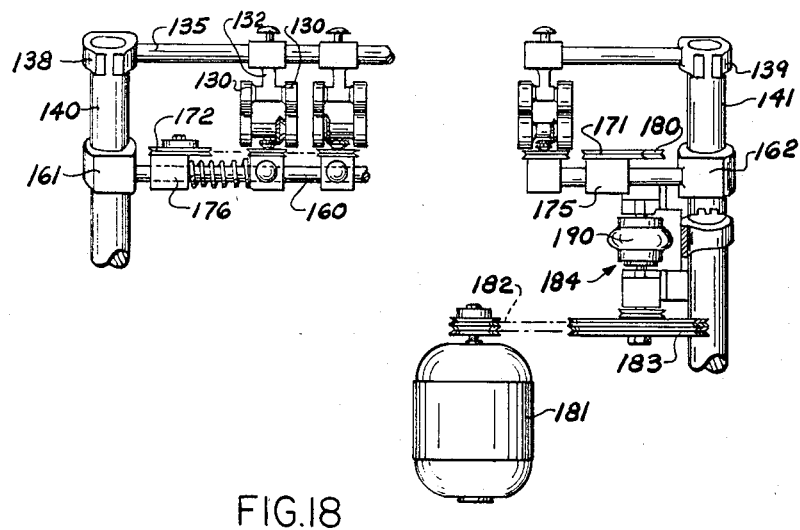
FIG. 18 is an end elevational view of the apparatus shown in FIG. 15, looking at the apparatus of FIG. 15 from the left.
Figure 19:
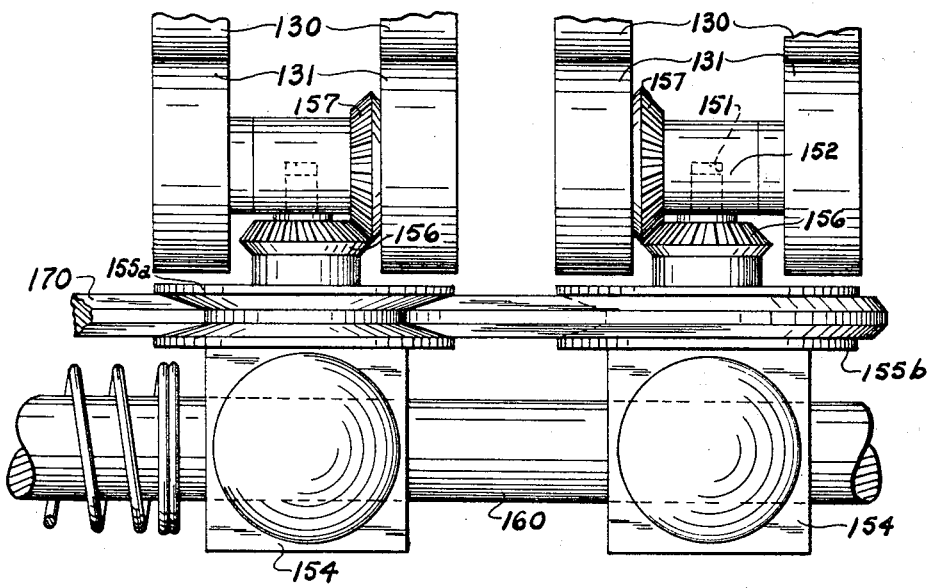
FIG. 19 is a fragmentary view illustrating a portion of the apparatus shown in FIG. 15.

The block members 133, 134 are adjustably secured to the rod members 135, 136, respectively, and may be moved relative thereto so as to adjust the locations of the opposite ends of the pair of tapes 130 carried by the support carriage 132. As shown in FIG. 16, the opposite ends of the tapes may be located in any position along the bars 133, 134 so as to provide for skewing or lateral separation of the carton blanks advanced thereby.

The lower tapes 131 are also supported in pairs which cooperate with the pair of tapes 130 supported by an individual support carriage 132. The tapes 131 are carried by a suitable support, designated 150. The support 150 adjacent the input end of the skewing unit 13 has an opening 151 therein which rotatably receives a locating pin member 152. The pin member 152 projects vertically from a block 154 which rotatably carries a pulley 155 and bevel pinion gear 156. The pulley 155 and bevel pinion gear 156 are rotatable relative to the block 154. The bevel pinion gear rotates upon rotation of the pulley 155 and meshes with a correspondingly beveled pinion gear 157 drivingly connected with the pair of tapes 131 so as to effect driving of the tapes on rotation thereof. The tapes 131 are in pressure relationship with the tapes 130 and upon driving of the tapes 131, the tapes 130 likewise are driven.

The blocks 154 are supported on a transversely extending rod 160. The rod 160 is connected at its opposite ends with collar members 161, 162. The blocks 154 are adjustable along the rod member 160 for adjustment of the input end of the tapes 131 to correspond with the adjustment of the tapes 130. The collar members 161, 162 are adjustable on the posts 141, 140 for vertical adjustment, as noted above in connection with the tapes 130. The output end of the tapes 131 are similarly mounted for adjustment. The output end of the tapes 131 and specifically the carrier 150 adjacent the output end of the tapes is supported by a block 165. The block 165 is adjustable along a bar 166 which extends transversely of the skewing unit 13 and which is secured to the vertically adjustable collars supported by the posts 144, 145. The blocks 165 are adjustable along the bar 166 so as to provide for adjustment of the output end of the tapes 131 as desired in order to effect the desired separation of the articles or carton blanks being conveyed through the skewing unit 13.

The tapes 130, 131 are driven at a speed approximately sixty percent of the speed of the stripper unit 12. The skewing conveyor unit 13 is driven at this slower speed in relation to the stripper unit 12 in view of the fact that the carton blanks are delivered thereto in two tiers, and thus at the slower speed, the skewing conveyor unit 13 is readily capable of handling the output of the stripper unit. The slower speed, of course, facilitates and assists in maintaining good control over the carton blanks which are delivered to the skewing conveyor unit.

The drive to the tapes 130, 131 is, as noted hereinabove, through the pulleys 155. A separate drive pulley 155 is provided for each set of tapes and thus a plurality of drive pulleys 155 are spaced across the input end of the skewing conveyor unit. All of the pulleys 155 are driven by a drive belt 170. The drive belt 170 is trained in a serpentine fashion around the pulleys 155. As best shown in FIG. 16, the belt 170 engages the left peripheral portion of the pulley 155a and engages the right peripheral portion of the adjacent pulley 155b and in this manner, serpentines through all of the pulleys 155. The belt is also trained around a pulley 171 at one side of the conveyor unit and another pulley 172 at the other side of the conveyor unit. The pulleys 171, 172 are suitably supported on block members 175, 176 which are supported on the bar member 160. The belt 170 also engages a guide or turning pulley 178 suitably supported on one side of the skewing conveyor unit 13. The belt 170 is also trained around a drive pulley 180 which is driven to effect driving of the belt 170. When the pulley 180 is driven, all of the pulleys described hereinabove are rotated, including the pulleys 155, due to the belt 170.

The drive pulley 180 is rotated by a motor 181 which has an output shaft operatively associated with a drive belt 182 which is trained around a pulley 183 supported on a shaft means 184 so as to rotate the shaft 184 upon rotation of the pulley. The shaft means 184 is drivingly connected to the pulley 180 so as to effect rotation of the pulley 180 upon rotation of the shaft means 184. The shaft means 184 includes a suitable interconnection 190 which permits vertical adjustment of the pulley 180 without also vertically adjusting the motor 181 and without disrupting the driving connection to the pulley 180 when it is adjusted vertically. Thus, the upper conveyor tier 135 may move vertically for adjustment purposes without disrupting the driving connection thereto.

In view of the serpentine nature in which the belt 170 is trained around the pulleys 155, the pulleys 155 may be adjusted with the conveyor tapes 130, 131 associated therewith laterally along the belt 170 without disrupting the driving connection between the pulleys 155 and the belt 170. Thus, the particular drive is not disrupted even though the pulleys 155 are adjusted when the conveyor tapes are adjusted so as to provide for the desired degree of separation of the carton blanks by the operation of the conveyor tapes.

The lower tier of conveyors 126 is constructed in a manner similar to the upper tier of conveyors 125 and is driven from the motor 181 by a similar drive connection, and in view of the similarity of these structures, the lower tier of conveyors 126 will not be described in detail.

Associated with each pair of tapes 130 of both the upper and lower tiers 125, 126 is a suitable nip providing pressure mechanism, designated 195. The pressure mechanism 195 is operable to provide a pressure relationship between a portion of the upper tape 130 and a portion of the lower tape 131. This pressure relationship is provided to effect a nip between the upper and lower tapes which engage the leading edge of the carton blanks and effect a feeding of the carton blanks through the tapes by the pressure relationship between the tapes. The location of the nip provided by the pressure mechanism 195 is adjustable due to the fact that the pressure mechanism 195 includes a plurality of arm members 196 which are pivotally carried by a support means and are pivotal relative thereto in order to force the upper tapes 130 downwardly toward the lower tapes 131 and provide this nip at different locations.

At the output end of the skewing conveyor units 13, the upper tapes 130 project beyond the lower tapes 131. This further projection of the upper tapes 130 is provided so as to provide a guide portion of the upper tapes 130 which effect a guiding of the carton blanks as they leave the skewing unit 13. The output ends of each pair of upper tapes 130 are trained around a suitable roller means 203 carried by an arm member 200. The arm member 200 is pivotally connected at 201 for pivotal movement about an axis extending transverse to the direction of movement of the carton blanks. The arm member 200 may be pivoted upon the screwing of a screw member 202 which engages the arm member 200. The screw member 202 provides movement of the arm member 200, and thus the movement of the roller 203 about which the tapes 130 are trained. By movement of the roller 203, the output end of the tapes 130 moves in a vertical direction, and the carton blank's output path is varied so as to provide the proper path of movement for the carton blanks as they leave the skewing conveyor unit 13 and are delivered into the shingling and stacking unit 14.

SHINGLING AND STACKING UNIT

The shingling and stacking unit 14 is operable to receive the carton blanks from the skewing conveyor unit 13 and to shingle the carton blanks and stack the carton blanks for removal from the apparatus. The shingling and stacking unit 14 includes upper and lower conveyor tiers 210 and 211, respectively, for receiving carton blanks from the conveyor tiers 125, 126 of the skewing conveyor unit 13.

The upper conveyor tier 210 includes a plurality of endless belt conveyors 210a spaced transverse to the direction of carton blank movement. Each conveyor is trained around a roller 215, 216 at its input and output ends, respectively. The rollers 215, 216 are supported by a frame structure 218. The frame structure 218 is suitably secured to collar members 219, 220 at the input and output ends of the unit 14, respectively, and which support the frame structure 218 on posts 221, 222, at the input and output ends of the unit 14, respectively. The collar members 219, 220 are movable relative to the post members 221, 222 for vertical adjustment of the upper tier of conveyors 210 for adjustment purposes.

The vertical adjustment of the upper tier conveyors 210 is effected by rotation of a handwheel 225, best shown in FIG. 22. Rotation of the handwheel 225 causes reciprocating vertical movement of a shaft member 226 through a gearbox 227 which provides a screw connection with the rod member 226 so as to effect vertical reciprocation of the rod member 226 when the handwheel 225 is rotated. The gearbox 227 is connected by a rod member 228 to a similar gearbox on the other side of the unit 14 and which is not shown. The rod member 226, as noted above, projects vertically and is connected at its outer end with a chain member 230. The chain member 230 extends vertically along the post 221 and is trained around a pulley member 232 at the upper end of the post. The other end of the chain opposite the end connected with the rod member 226 is connected with the collar member 219 which carries the input end of the upper tier 210 of conveyors.

When the rod member 226 moves vertically, the weight of the upper tier of conveyors causes the chain member to lower the collar 219 and thereby causes lowering movement of the upper tier of conveyors 210. When the rod member 226 is moved downwardly, the rod member will pull the chain 230 therewith and causes raising of the upper tier of conveyors 210. The raising and lowering movements of the input end of the upper tier of conveyors is permitted due to the construction of the collar 220 which permits pivotal movement of the frame 218 relative thereto.

The plurality of conveyors 210a which comprise the upper tier 210 of conveyors are driven at a very slow rate of speed as compared to the speed of the skewing conveyor tier 125 in the skewing conveyor unit and are driven by a motor 235, shown in FIG. 21. The motor 235, when energized, drives a vertically extending output shaft 236 through a suitable gear connection 237. The shaft 236 extends vertically to a gearbox 240 which is connected so as to effect a driving of the rollers 215 when the shaft 236 is rotated. The shaft 236 is provided with a telescoping connection therein so as to permit the vertical movement of the input end of the upper tier 210 of conveyors without disrupting the drive thereto.

Carton blanks which are delivered from the upper tier of conveyors 125 of the skewing conveyor unit 13 are fed onto the upper runs of the conveyors 210a of the upper tier 210 of the shingling and stacking unit 14. The carton blanks are fed onto the conveyors 210a at a speed greatly in excess of the speed of the conveyors 210a. The cartons, when fed onto the conveyors, are stopped from sliding movement relative thereto due to the velocity of their being delivered to the conveyors 210a by adjustable rolls 245. There are a plurality of rolls 245 with one such roll associated with each of the conveyors 210a and resting on the upper run of the conveyor 210a to engage the leading end of the carton blanks fed onto the conveyor 210a. The rolls 245 thus function to provide a stop so that the carton blanks are properly received by the shingling and stacking unit.

Each roll 245 is biased into engagement with the upper run of its associated conveyor 210a. The roll 245 is supported for pivotal movement relative to the conveyor on an arm 246 which is pivotal about a pivot axis 247 relative to a support structure 248 which supports the arm 246 and the roll 245. The roll 245 moves upwardly away from the upper run of the conveyor 210a in order to permit carton blanks to move thereunder.

In view of the fact that the carton blanks are delivered to the conveyor 211 at a higher rate of speed than the conveyor 210b conveys the carton blanks, the carton blanks are shingled on the conveyor 211. This shingling occurs, of course, by feeding each successive carton blank onto the top of the preceding carton blank which, obviously, would occur because of the nature of the speeds of operation of the conveyors.

The rolls 245 which engage the upper surface of the conveyors 210a and function to provide a stop for the leading edge of the carton blanks which are fed thereto are adjustable so as to readily handle different length carton blanks. This adjustment may be effected by rotation of a handwheel 250. The handwheel 250 is connected with a shaft member 251 which extends beneath the upper tier 210 of conveyors 210a and which is supported by the support portion 248 for the rolls 245. The shaft 251 carries at its opposite ends pinion gears 252. The pinion gears 252 mesh with fixed racks 254 respectively, fixed to the frame 218 for the upper tier of conveyors. Thus, upon rotation of the handwheel, the pinions rotate along the racks with which they are in mesh and effect an adjustment of the support structure 248 and the rolls 245 along the upper surface of the conveyors 211.

At the output end of the upper tier of conveyors 210, the shingled carton blanks are formed into stacks spaced transversely of the direction of feed of the carton blanks. The stacks are formed and received in trays 260 supported at the output end of the conveyors 210a. The trays 260 include a lower support 261 onto which the shingled carton blanks are fed and generally a vertically extending support 262 which functions as a backstop so as to prevent the carton blanks from sliding off the support 261. Thus, the cartons are stacked in the trays 260 as they leave the conveyors 210a. When the trays 260 are filled, the stacks of carton blanks are removed therefrom by an operator so that the blanks may then be shipped to a use location.

The lower tier 211 of conveyors in the shingling and stacking unit 14 is similar in construction to the upper tier, described hereinabove, and therefore the lower tier will not be described in detail, and similar reference numerals are used to designate corresponding parts of the structures. The lower tier of course, includes a plurality of conveyors 211a which are spaced transversely of the feed of the carton blanks. The conveyors 211a are adjustable vertically by rotation of a handwheel 270 which, when rotated, causes rotation of a shaft 271 and vertical movement of a rod member 272 through a gearbox 273. At the same time, a rod member on the other side of the apparatus and similar to the rod member 272 is also vertically reciprocated due to rotation of a rod 274 which extends transversely of the apparatus. When the rod member 272 is moved vertically, the lower tier 211 of conveyors 211a are likewise moved vertically due to the fact that the upper end of the rod member 272 is pivotally connected to the frame structure which supports the conveyors 211 by means of a connecting rod 280.

The drive to the conveyors 211a is similar to the drive to the conveyors 210a. A separate motor 290 is provided having an output shaft 291 which is connected through a gearbox 292 to effect rotation of the rolls around which the conveyors 211 are trained. The drive shaft 291 is provided with a telescoping connection so as to permit the vertical movement and adjustment of the lower tier of conveyors 211 without breaking the drive connection thereto.

Each conveyor 211a also has associated with it a roll 300 which is similar to the rolls 245 associated with the conveyors 210a. The rolls 300 function in the same manner as the rolls 245 and are adjustable in the same manner as described above in connection with the rolls 245. In view of the similarity in the construction, the rolls and the adjustment thereof will not again be described.

The conveyors 211a project somewhat farther than the conveyors 210a and at the output end of the lower tier of conveyors 211a a plurality of trays 301 are located which receive the carton blanks. The trays 301 are similar to the trays 260 at the output end of the conveyors 210a. The carton blanks which are received on the conveyors 211a are delivered from the output end of the conveyors 211a and moved into the trays 301 in which they are stacked and from which they may be removed from the apparatus.

The conveyors 210a, 211a, when it is desired to segregate or control the number of cartons in a stack, may be increased in speed to separate the carton blanks from those to be delivered when the proper number of carton blanks has been received by the conveyors 210a, 211a. This may be effected by providing a counter for counting the number of carton blanks delivered to the conveyors 210a, 211a. When the desired number of carton blanks has been delivered thereto, the motors for driving the conveyors 210a, 211a may be energized to increase the speed thereof for a given instance so as to separate those carton blanks to the predetermined number from the next carton blanks fed thereto. In this manner, a separation of the carton blanks so as to provide the proper number of carton blanks in each stack may be effected.

From the above description, it should be apparent that the units 11, 12, 13 and 14 are adjusted and modified in order to switch from job to job. To provide for access to these various units when they are to be modified, the stripped unit 12 is mounted on spaced tracks 310, best shown in FIG. 1, and may be moved along the tracks in a direction corresponding to the direction of carton blank feed away from the cutting unit 11. The skewing conveyor unit 13 and the shingling unit 14 are also mounted on tracks 312 for movement away from each other in the direction of carton blank feed. When the stripper unit 12 has been so moved, an operator may work upon the cutting unit 11 and/or replace the dies 31, 32 on the cylinders 26, 27 and make any other adjustments desired. The operator likewise may operate upon the skewing conveyor unit 13 so as to make the desired adjustments thereto when it has been so moved. Moreover, the stripper unit 12 likewise may be worked upon by the operator so as to replace the sheaths 42, 111 on the cylinders 35, 36, respectively, and make any other adjustments which are necessary. When the shingling and stacking unit 14 is moved away from the skewing conveyor unit 13, an operator may then make the desired adjustments on the output end of the skewing conveyor unit 13, as well as on the input end of the shingling and stacking unit 14. Thus, in this manner, the various units are associated so as to be readily accessible for adjustment purposes.

FIG. 23 illustrates a material processing apparatus 350 similar to the material processing apparatus 10 and incorporating similar parts which will be given similar reference numerals. The material processing apparatus 350 performs the same operations as the material processing apparatus 10 described hereinabove, and includes a cutting unit 11 which includes cooperating cylinders 26, 27 which carry a cutting nip in which material being processed is cut. A suitable conveyor arrangement 33 is provided for delivering the cut material from the cutting unit 11 into the stripper unit 12. The material is delivered to the stripper unit 12 by separate conveyor arrangements into the upper and lower tiers 125, 126, respectively, of the skewing conveyor unit 13.

The primary difference between the material processing apparatus 350 and the material processing apparatus 10, described in detail hereinabove, is in the stripper unit 12 thereof and, particularly, in the disposition of the carton blank cylinder 35 which carries the sucker members and which engage the carton blank and the broke cylinder 36.

As shown in FIG. 23, the carton cylinder 35 is offset in the direction of feed of the carton blanks from a vertical line extending through the center of rotation of the broke cylinder 36. Thus, a line through the centers of these cylinders is not a perpendicular line but rather extends at an acute angle to the horizontal.

By disposing the cylinders 35, 36 in the particular position shown in FIG. 23, the carton blanks which are carried by the cylinder 35 are carried through a wide arc around the periphery of the cylinder and are carried a distance greater than the distance at which the carton blanks are carried by the cylinder 35. In view of the fact that the carton blanks are carried a greater distance by the cylinder 35 in the apparatus 350, a more reliable separation of the carton blanks and waste occurs with less tendency of the carton blanks to move with the waste.

It should be apparent from the description thereinabove that applicant has provided a highly improved material processing apparatus. The preferred embodiment thereof has been described in great detail, and it should also be apparent that certain modifications, changes, and adaptations may be made in the preferred embodiment, and it is intended to cover all such modifications, changes, and adaptations which come within the scope of the appended claims.

Having described my invention, I claim:

1. An apparatus for processing sheet material comprising a first pair of rotary cylinders defining a cutting nip, said first pair of cylinders having material engaging portions for engaging the sheet material and cutting the sheet material into articles and waste as the material is advanced through said cutting nip, a second pair of cooperating rotary cylinders driven at the surface speed of said first pair of rotary cylinders and defining a material stripping nip therebetween and cooperable to separate the waste and the articles, means for conveying the articles away from said stripping nip including conveyor means defining a pair of paths for said articles, and one of said second pair of rotary cylinders having means thereon for engaging at least alternate articles received in said stripping nip and delivering said alternate articles into one of said pair of paths with the other articles being delivered into the other of said pair of paths.

2. An apparatus for processing sheet material as defined in claim 1 wherein said stripping nip is spaced from said cutting nip a distance less than the dimension of the sheet material as measured in the feeding direction whereby the material of one sheet is located in both of said nips for a predetermined interval.

3. An apparatus for processing sheet material as defined in claim 1 wherein said conveyor means defining said pair of paths comprises a plurality of endless conveyors driven at a speed substantially slower than the surface speed of said rotary cylinders.

4. An apparatus for processing sheet material as defined in claim 1 wherein said one of said rotary cylinders includes further means for engaging said other articles and delivering them into said other pair of paths.

5. An apparatus for processing sheet material as defined in claim 4 wherein the other of said second pair of rotary cylinders includes means operable to move all waste from said stripping nip and away from said articles.

6. An apparatus for processing sheet material as defined in claim 1 wherein said articles when cut are located in axially adjacent positions and further including a skewing conveyor means operable to receive the articles in each of said paths and laterally separate the articles and said skewing conveyor means including a plurality of tape conveyors driven at a speed substantially slower than the surface speed of the cylinders for directing articles along each of said paths.

7. An apparatus for processing sheet material as defined in claim 6 further including an article shingling and stacking means including a plurality of endless conveyors for receiving articles in each path of movement from said tape conveyors and operable at a speed substantially slower than said tape conveyors, and stacking trays at the output end of said endless conveyors into which said shingled articles are conveyed and in which the articles are stacked.

8. An apparatus for processing sheet material comprising a first pair of rotary cylinders defining a cutting nip, said first pair of cylinders having material engaging portions for engaging the sheet material and cutting the sheet material as the material is advanced through said cutting nip into articles and waste with at least a pair of articles spaced axially of said cylinders in a side-by-side relation, a second pair of cooperating rotary cylinders driven at the surface speed of said first pair of cylinders and defining a stripping nip and cooperable to separate the waste and the articles, means for guiding the material between said cutting nip and said stripping nip, and means for receiving said articles from said stripping nip in at least two paths and conveying said articles away from said stripping nip in said at least two paths at a speed substantially slower than the surface speed of said cylinders and for laterally separating said articles while they are conveyed away from said stripping nip.

9. An apparatus for processing sheet material as defined in claim 8 wherein said means for receiving said articles in at least two paths and laterally separating said articles comprises a plurality of tape conveyor means having separately and laterally adjustable input and output ends and located with their output ends spaced farther than their input ends so as to laterally separate the articles.

10. An apparatus for processing sheet material comprising a first pair of rotary cylinders defining a cutting nip, said first pair of cylinders having material engaging portions for engaging the sheet material and cutting the sheet material into articles and waste as the material is advanced through said cutting nip, a second pair of cooperating rotary cylinders driven at the surface speed of said first pair of cylinders and defining a material stripping nip therebetween and cooperable to separate the waste and the articles, means supporting said second pair of cylinders so that said stripping nip is spaced from said cutting nip a distance less than the dimension of the sheet material as measured in the feeding direction whereby the material of one sheet is located in both of said nips for a predetermined interval of time, and means for guiding the material between said cuttting nip and said stripping nip.

11. An apparatus for processing sheet material cut into waste and articles comprising a pair of oppositely rotatable cylinders defining a stripping nip therebetween, one of said cylinders having means for engaging said articles and conveying said articles with the cylinder upon rotation thereof to a release location at which the articles are released from said cylinder, the other of said cylinders having means for removing said waste from said stripping nip in a direction different from the direction of movement of said articles whereby said articles and waste are effectively separated as the material is advanced through said stripping nip, said one of said cylinders having an outer peripheral surface provided by a flexible sheath, and said means for engaging each of said articles comprises sucker members which project through openings in said sheath so as to engage said articles.

12. An apparatus for processing sheet material as defined in claim 11 wherein said one of said cylinders includes other sucker members which are located interiorly of said sheath and engage the inner surface of said sheath in a sealing engagement therewith and are thus rendered inoperative.

13. An apparatus for processing sheet material cut into waste and articles comprising a pair of oppositely rotatable cylinders defining a stripping nip therebetween, one of said cylinders having means for engaging said articles and conveying said articles with the cylinder upon rotation thereof to a release location at which the articles are released from said cylinder, the other of said cylinders having means for removing said waste from said stripping nip in a direction different from the direction of movement of said articles whereby said articles and waste are effectively separated as the material is advanced through said stripping nip, said means for engaging said articles comprising a plurality of sucker members carried by said one cylinder, said sucker members being arranged in sets of axially spaced sucker members, and a bar member supporting each set of axially spaced sucker members, said bar member extending axially of said cylinder and adjustable circumferentially of said cylinder so as to adjust the circumferential position of the set of sucker members carried by said bar.

14. An apparatus for processing sheet material as defined in claim 13 wherein the bar for a set of sucker members has a fluid passageway therein communicating with the sucker members carried thereby, and further including first valve means operable to connect said fluid passageway with a source of vacuum, second valve means operable to connect said fluid passageway with a source of air pressure, actuating means for operating said first valve means to cause said sucker members carried by said bar and projecting through said opening in said sheath member to grip said articles at the predetermined time, and actuating means for operating said second valve means to cause an air pressure to be applied to said sucker members to effect blowing of the articles off those sucker members which have gripped articles.

15. An apparatus for processing sheet material as defined in claim 14 wherein said actuating means for operating said first valve means and second valve means comprise separate cam members which engage valve operating members at the desired time during the rotation of said cylinders.

16. An apparatus for processing sheet material as defined in claim 14 wherein said cylinder includes a central shaft portion, said central shaft portion having a vacuum chamber connected to a vacuum source located therein and an air chamber connected with an air pressure supply located therein with said vacuum and air chambers being connected with said first and second valve means, respectively, by separate fluid conduit means.

17. An apparatus for processing sheet material as defined in claim 13 including means for adjusting said bar carrying said set of sucker members circumferentially of said cylinder.

18. An apparatus for processing sheet material as defined in claim 17 wherein each of said bars is supported by a plurality of plate members rotatable about a central shaft portion of said cylinder, and said actuating means comprises a rod member projecting through openings in said plate members and rotatable therein, said rod member carrying pinion means fixed thereon and in mesh with fixed gear means so as to walk around said gear means upon rotation of said rod whereby said plate members rotate relative to said central shaft portion effecting rotation of said bar member and circumferentially adjusting movement of said sucker members.

19. An apparatus for processing sheet material cut into waste and articles comprising a cylinder member having an outer peripheral surface with said material being advanced adjacent thereto with a leading edge portion of said material at least in part constituting waste, a plurality of pin members carried by said cylinder and movable radially from a location wherein the pin members are located interiorly of said cylinder and a location where at least a portion of the pin members project beyond said outer peripheral surface and engage the waste at the leading edge portion of said material, said pin members being carried by a bar member supported for radial movement, a plurality of links pivotally connected to said bar member at one end and pivotally connected to a beam member at their other end, means supporting said beam member for reciprocating movement in an axial direction relative to said cylinder, and cam means for reciprocating said beam member axially of said cylinder to effect radial movement of said pin members.

20. An apparatus for processing sheet material as defined in claim 19 wherein said outer peripheral surface of said cylinder member is provided by a flexible sheath which is releasably secured at its opposite circumferential ends and wherein said sheath has a plurality of openings therein through which said pin members move.

21. An apparatus for processing sheet material cut into waste and articles comprising a pair of oppositely rotatable cylinders defining a stripping nip therebetween, one of said cylinders having means for engaging said articles and conveying said articles with the cylinder upon rotation thereof to a release location at which the articles are released from said cylinder, the other of said cylinders having means for removing said waste from said stripping nip in a direction different from the direction of movement of said articles whereby said articles and waste are effectively separated as the material is advanced through said stripping nip, said material being cut into internal and external waste and articles and said other of said cylinders includes means operable to engage the external waste and convey the external waste therewith around the periphery of the cylinder upon rotation of the cylinder to a release location, and said other of said cylinders includes means operable to remove the internal waste from said stripping nip in a direction other than the direction of removal of said external waste.

22. An apparatus for processing sheet-like articles located laterally adjacent to each other comprising a plurality of tape conveyor means for conveying said sheet-like articles, each of said tape conveyor means comprising first and second tape means for engaging opposite sides of the articles in pressure engagement so as to convey said articles upon movement of said tape means, said tape conveyor means having input ends at which the articles are received by said tape conveyor means and output ends from which the articles are discharged from said tape conveyor means, said plurality of tape conveyor means being disposed in a spaced fan-like manner with the output ends of adjacent tape conveyor means spaced apart a greater distance than the input ends thereof so as to be operable to laterally separate said articles as they are conveyed thereby, means supporting said input ends of said tape conveyor means for lateral adjustment relative to each other, means supporting said output ends of said tape conveyor means for lateral adjustment relative to each other, and means for driving said plurality of tape conveyor means at substantially the same speed.

23. An apparatus for processing sheet-like articles as defined in claim 22 wherein said means for driving said tape conveyor means comprises separate pulleys with each of said pulleys drivingly connected with each of said tape conveyor means for driving said tape conveyor means upon rotation thereof, a driving belt trained around said pulleys in a serpentine fashion engaging one peripheral surface portion on one pulley and the opposite peripheral surface portion of the next adjacent pulley.

24. An apparatus for processing sheet-like articles as defined in claim 23 wherein said means supporting the input and output ends of said tape conveyor means for lateral adjustment toward and away from each other includes means supporting said pulleys for adjustment simultaneously with one end of said tape conveyors along said driving belt without disrupting the driving connection thereto.

25. An apparatus for processing sheet material comprising a pair of cooperable cylinders for cutting said sheet material into waste and articles as it is being conveyed, the articles being arranged when cut in at least first and second rows extending transverse to the direction of movement of the sheet material with each row comprising a plurality of laterally adjacent articles, stripper means for stripping the waste material from said articles comprising a cylinder carrying a plurality of pin members located to impale said waste and carry said waste away from the articles upon rotation of the cylinder, classifying means for directing said first row of articles into a first path and said second row of articles into a second path, said classifying means including conveyor means for conveying said first and second rows in different paths away from said pin carrying cylinder, and skewing conveyor means for receiving said articles from said classifying conveyor means and operating to convey the articles in said first and second paths and operable to laterally separate the articles in the rows while conveying them.

26. An apparatus for processing sheet material as defined in claim 25 wherein said skewing conveyor means includes a plurality of skewed tape conveyors.

References Cited

UNITED STATES PATENTS

| | | | |
|---|---|---|---|
| 709,789 | 91902 | Meek. | |
| 2,208,433 | 7/1940 | Seft | 271—76 |
| 2,594,804 | 4/1952 | Ringel | 93—36 |
| 2,655,842 | 10/1953 | Baumgartner | 93—36 |
| 2,778,286 | 1/1957 | Walker | 93—36 |
| 3,117,499 | 1/1964 | Golding | 93—36 |
| 2,682,208 | 6/1954 | Monroe et al. | 93—58.2 X |
| 3,320,864 | 5/1967 | Zernov | 93—36 |

BERNARD STICKNEY, *Primary Examiner.*